(12) United States Patent
Shirai et al.

(10) Patent No.: US 10,241,934 B2
(45) Date of Patent: Mar. 26, 2019

(54) SHARED MEMORY CONTROLLER, SHARED MEMORY MODULE, AND MEMORY SHARING SYSTEM

(71) Applicant: Toshiba Memory Corporation, Minato-ku (JP)

(72) Inventors: Satoshi Shirai, Kawasaki (JP); Tatsunori Kanai, Yokohama (JP); Yusuke Shirota, Yokohama (JP)

(73) Assignee: Toshiba Memory Corporation, Minato-ku (JP)

( * ) Notice: Subject to any disclaimer, the term of this patent is extended or adjusted under 35 U.S.C. 154(b) by 0 days.

(21) Appl. No.: 15/695,726

(22) Filed: Sep. 5, 2017

(65) Prior Publication Data

US 2018/0267906 A1    Sep. 20, 2018

(30) Foreign Application Priority Data

Mar. 16, 2017    (JP) ................................. 2017-051625

(51) Int. Cl.
*G06F 12/02* (2006.01)
*G06F 12/14* (2006.01)
(Continued)

(52) U.S. Cl.
CPC ...... *G06F 12/1475* (2013.01); *G06F 12/0238* (2013.01); *G06F 12/1483* (2013.01);
(Continued)

(58) Field of Classification Search
CPC ........ G06F 12/0238; G06F 12/1458–12/1491; G06F 13/1663; G06F 15/17331
See application file for complete search history.

(56) References Cited

U.S. PATENT DOCUMENTS

| 6,779,063 B2 | 8/2004 | Yamamoto |
| 6,944,690 B2 | 9/2005 | Yamamoto |

(Continued)

FOREIGN PATENT DOCUMENTS

| JP | 2008-4120 | 1/2008 |
| JP | 2008-123031 | 5/2008 |

OTHER PUBLICATIONS

Arpaci-Dusseau et al. "Removing the Costs of Indirection in Flash-based SSDs with Nameless Writes ." Jun. 2010. USENIX. HotStorage '10. https://www.usenix.org/legacy/events/hotstorage10/tech/full_papers/Arpaci-Dusseau.pdf.*

*Primary Examiner* — Nathan Sadler
(74) *Attorney, Agent, or Firm* — Oblon, McClelland, Maier & Neustadt, L.L.P.

(57) ABSTRACT

According to an embodiment, upon receiving a use request including an identifier of a program and authentication information, a use request processing unit makes a determination on validity of the use request based on an ID management information and access authority management information, generates an access key when the use request is valid, registers the access key in access key management information in correlation with a usable address range, and returns the access key to a transmission source of the use request. Upon receiving a read/write request including an address where reading-out or writing of data is performed and an access key, a read/write request processing unit makes a determination on validity of the read/write request based on the access key management information, and executes reading-out or writing of data with respect to a shared memory in response to the read/write request when the read/write request is valid.

8 Claims, 17 Drawing Sheets

(51) Int. Cl.
*G06F 13/16* (2006.01)
*G06F 21/44* (2013.01)

(52) U.S. Cl.
CPC .......... *G06F 13/1663* (2013.01); *G06F 21/44* (2013.01); *G06F 2212/1052* (2013.01)

(56) References Cited

U.S. PATENT DOCUMENTS

| | | | |
|---|---|---|---|
| 7,016,991 B2 | 3/2006 | Yamamoto | |
| 7,035,950 B2 | 4/2006 | Yamamoto | |
| 7,167,960 B2 | 1/2007 | Kodama et al. | |
| 7,174,399 B2 | 2/2007 | Yamamoto | |
| 7,404,053 B2 | 7/2008 | Kodama et al. | |
| 7,788,459 B2 | 8/2010 | Kodama et al. | |
| 8,051,053 B2 * | 11/2011 | Camiel | G06F 21/78 707/609 |
| 9,471,812 B2 * | 10/2016 | He | G06F 21/79 |
| 2002/0138701 A1 * | 9/2002 | Suzuoki | G06F 12/1466 711/154 |
| 2012/0317385 A1 | 12/2012 | Driever et al. | |
| 2013/0346718 A1 * | 12/2013 | Meshchaninov | G06F 12/0623 711/164 |
| 2014/0020083 A1 * | 1/2014 | Fetik | G06F 21/552 726/11 |
| 2014/0059284 A1 | 2/2014 | Fang et al. | |
| 2015/0143134 A1 * | 5/2015 | Hashimoto | G06F 21/6209 713/193 |
| 2016/0110297 A1 * | 4/2016 | Sharma | G06F 12/1458 713/193 |
| 2018/0095898 A1 * | 4/2018 | Khosravi | G06F 21/445 |
| 2018/0157822 A1 * | 6/2018 | Shan | G06F 21/44 |

\* cited by examiner

| ADDRESS RANGE | ACCESS KEY |
|---|---|
| 0x010000 TO 0x018000 | 0517f637-91c4-4e88 |
| 0x238000 TO 0x300000 | a8429fd6-43fc-4b4e |
| 0x325000 TO 0x400800 | 7fb15d2d-3d9d-4b2e |
| ⋮ | ⋮ |

FIG.4A

| DESIGNATION OF ADDRESS THAT IS DESIRED TO USE | PROGRAM ID | AUTHENTICATION INFORMATION |
|---|---|---|

FIG.4B

| DESIGNATION OF MEMORY QUANTITY WHICH IS DESIRED TO USE | PROGRAM ID | AUTHENTICATION INFORMATION |
|---|---|---|

FIG.5

| TYPE INDICATING EITHER READING-OUT OR WRITING | TARGET ADDRESS | ACCESS KEY | (WRITING DATA) |
|---|---|---|---|

FIG.8

| ADDRESS RANGE | PROGRAM ID TO WHICH READ/WRITE IS PERMITTED |
|---|---|
| 0x010000 TO 0x018000 | program1 |
| 0x238000 TO 0x300000 | d43d7e0aa4ce |
| 0x325000 TO 0x400800 | program2 |
| 0x325000 TO 0x400800 | program3 |
| ⋮ | ⋮ |

FIG.9

| ADDRESS RANGE | ACCESS KEY |
|---|---|
| 0x010000 TO 0x018000 | 0517f637-91c4-4e88 |
| 0x238000 TO 0x300000 | a8429fd6-43fc-4b4e |
| 0x325000 TO 0x400800 | 7fb15d2d-3d9d-4b2e |
| 0x325000 TO 0x400800 | 94edc936-f31a-11e6 |
| ⋮ | ⋮ |

FIG.14

| DESIGNATION OF MEMORY QUANTITY THAT IS DESIRED TO USE | PROGRAM ID | AUTHENTICATION INFORMATION | ADDITIONAL INFORMATION |
|---|---|---|---|

FIG.15

| TYPE INDICATING EITHER READING-OUT OR WRITING | TARGET ADDRESS RANGE | ACCESS KEY | (WRITING DATA) |
|---|---|---|---|

FIG.16

| ADDRESS RANGE | ADDRESS OF SERVER TO WHICH DATA IS TRANSMITTED |
|---|---|
| 0x010000 TO 0x018000 | 192.0.2.73 |
| 0x238000 TO 0x300000 | 192.0.2.44 |
| 0x325000 TO 0x400800 | 192.0.2.233 |
| 0x325000 TO 0x400800 | 192.0.2.58 |
| ⋮ | ⋮ |

FIG.17

| ADDRESS RANGE | ACCESS KEY | ADDRESS OF SERVER THAT IS ACCESS DESTINATION |
|---|---|---|
| 0x010000 TO 0x018000 | 0517f637-91c4-4e88 | 192.0.2.1 |
| 0x238000 TO 0x300000 | a8429fd6-43fc-4b4e | 192.0.2.73 |
| 0x325000 TO 0x400800 | 7fb15d2d-3d9d-4b2e | 192.0.2.1 |
| ⋮ | ⋮ | ⋮ |

FIG.18

| ADDRESS RANGE | ACCESS KEY |
|---|---|
| 0x010000 TO 0x018000 | 0517f637-91c4-4e88 |
| 0x238000 TO 0x300000 | a8429fd6-43fc-4b4e |
| 0x325000 TO 0x400800 | 7fb15d2d-3d9d-4b2e |
| ⋮ | ⋮ |

US 10,241,934 B2

SHARED MEMORY CONTROLLER, SHARED MEMORY MODULE, AND MEMORY SHARING SYSTEM

CROSS-REFERENCE TO RELATED APPLICATIONS

This application is based upon and claims the benefit of priority from Japanese Patent Application No. 2017-051625, filed on Mar. 16, 2017; the entire contents of which are incorporated herein by reference.

FIELD

Embodiments described here relate generally to a shared memory controller, a shared memory module, and a memory sharing system.

BACKGROUND

Recently, research and development of a technology called a storage class memory (SCM) has progressed, and an SCM device to which the technology is applied appears. The SCM device represents a high-speed and high-capacity nonvolatile memory having an intermediate property between a memory, such as a dynamic random access memory (DRAM) used as a main memory of a computer, and a storage, such as a solid state drive (SSD) and a hard disk drive (HDD). If a plurality of servers can share an SCM device, there is a possibility that the SCM device can be utilized as a huger memory in comparison to a DRAM in a single server.

An operation, in which data is stored in a storage connected to a network and the data is shared between a plurality of servers, has been already in practice. In this case, if management of access authority to the data, which is shared on the storage, is not appropriately performed, unexpected data loss, leakage of secret information, and the like may simply occur. Therefore, in the related art, access authority management and the like has been performed by using a permission function on a file system, and the like.

In a case of using the SCM device as a shared memory, if not using characteristics of the SCM device, that is, high speed and refinement (byte unit) of access granularity, the intrinsic worth of the SCM device is not exhibited. Specifically, if not providing a unit that performs access in the same granularity as the granularity of a typical read/write command of a processor, e.g., a load/store command in a central processing unit (CPU) instead of performing read/write with a file IO similar to a storage with a large overhead; it is difficult to avoid an access overhead. Accordingly, it is difficult to meet expectations with a structure of the related art in which a file system is provided through network connection, and there is a demand for construction of a new structure.

BRIEF DESCRIPTION OF THE DRAWINGS

FIGS. 4A and 4B are views illustrating examples of a data structure of a use request;
FIG. 5 is a view illustrating an example of a data structure of a read/write request;
FIG. 8 is a view illustrating an example of an access authority management table;
FIG. 9 is a view illustrating an example of an access key management table;
FIG. 14 is a view illustrating an example of the data structure of the use request;
FIG. 15 is a view illustrating an example of the data structure of the read/write request;
FIG. 16 is a view illustrating an example of a lending table;
FIG. 17 is a view illustrating an example of an extended key management table;
FIG. 18 is a view illustrating an example of a acceptance key management table.

DETAILED DESCRIPTION

Figure 1:
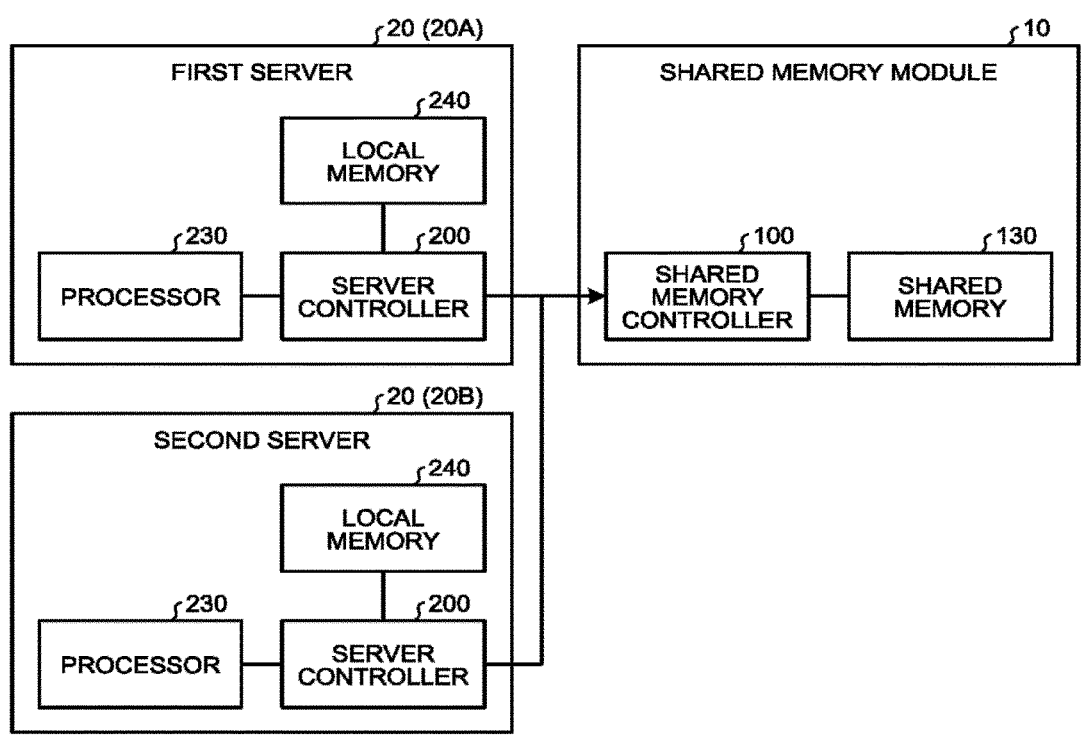
FIG. 1 is a block diagram illustrating a schematic configuration of a memory sharing system according to an embodiment.

According to an embodiment, a shared memory controller that controls access to a shared memory, includes a storage, and processing circuitry. The storage stores therein ID management information in which an identifier of a program that uses the shared memory and authentication information are associated with each other, accesses authority management information in which an address range and an identifier of a program for which access to the address range is permitted are associated with each other, and accesses key management information in which an address range and an access key for access to an address within the address range are associated with each other. Upon receiving a use request including an identifier of a program and authentication information, the processing circuitry makes a determination on validity of the use request based on the ID management information and the access authority management information. When the use request is valid, the processing circuitry generates an access key, registers the generated access key in the access key management information in correlation with a usable address range, and returns the generated access key and the usable address range to a transmission source of the use request. Upon receiving a read/write request including an address where reading-out or writing of data is performed and an access key, processing circuitry makes a determination on validity of the read/write request based on the access key management information. When the read/write request is valid, the processing circuitry executes reading-out or writing of data with respect to the shared memory in response to the read/write request.

Hereinafter, a shared memory controller, a shared memory module, and a memory sharing system of embodiments will be described in detail with reference to the accompanying drawings. Furthermore, in the following description, the same reference numeral will be given to constituent elements having the same function, and redundant description thereof will be appropriately omitted.

Summary of Embodiment

In this embodiment, a controller is disposed in a shared memory module that is shared by a plurality of servers, and disposed in each of the servers which uses the shared memory module. Hereinafter, a controller that is disposed in the server is referred to as "server controller", and a controller that is disposed in the shared memory module is referred to as "shared memory controller". The server controller and the shared memory controller perform a communication relay between a processor (for example, a CPU) of a server and the shared memory module.

In a case where an application program (hereinafter, simply referred to as "program") that is executed on an operating system (OS) by the processor of the server accesses to a shared memory in the shared memory module, first, the server controller transmits a use request to the shared memory module. The shared memory controller performs confirmation of authentication of the program, access authority, and the like based on information that is included in the use request. When the use request is valid, the shared memory controller generates a temporal access key, and returns the access key to the server. Then, the server controller transmits a read/write request, in which the access key is added to a typical read/write command (for example, a load/store command from a CPU) issued by the processor, to the shared memory module. In addition, the shared memory controller confirms access authority based on the access key. When the read/write request from the server is valid, the shared memory controller executes an operation that is expected to the shared memory module in response to the read/write request. According to this, the server can access the shared memory in very fine granularity similar to a typical read/write command of a processor in execution of the program, and can performs an appropriate access control on the shared memory module side.

First Embodiment

FIG. 1 is a block diagram illustrating a schematic configuration of the memory sharing system according to this embodiment. As illustrated in FIG. 1, the memory sharing system has a configuration in which a plurality of servers 20 sharing a shared memory module 10 are connected to the shared memory module 10 in a communication-possible manner. Furthermore, in FIG. 1, two servers 20 including a first server 20A and a second server 20B are illustrated, but the number of the servers 20 which share the shared memory module 10 is not limited to two.

Each of the plurality of servers 20 (the first server 20A and the second server 20B in FIG. 1) includes a processor 230, a local memory 240, and a server controller 200. On the other hand, the shared memory module 10 includes a shared memory 130 and a shared memory controller 100.

In a case of an access from the server 20 to the shared memory module 10, the processor 230 performs a communication with the shared memory module 10 through the server controller 200, and accesses the shared memory 130 in the shared memory module 10.

It is not necessary for the shared memory 130 in the shared memory module 10 to be a single device, and may include a plurality of memory devices. Particularly, in addition to a DRAM that is widely used as a main memory in current, a memory device, which is generally referred to as an SCM device, may be used. The SCM is a large-capacity nonvolatile memory for which reading and writing are possible at a high speed, and examples thereof include nonvolatile memories such as a magnetoresistive random access memory (MRAM), a phase change memory (PCM, may be referred to as a PRAM or a PCRAM), a resistance random access memory (ReRAM), and a ferroelectric random access memory (FeRAM). The SCM has characteristics in which capacity is greater than capacity of a volatile memory such as the DRAM, and reading and writing are possible at a higher speed in comparison to a storage such as an SSD and an HDD.

The processor 230 executes a program on an OS, and issues a command for securement of a memory that is requested by the program or read/write (reading or writing) of data. The server controller 200 adds information, which is necessary for a determination on access authority to be described later, to the command of the processor 230, and makes a request for the shared memory module 10 to secure a memory or to read or write data.

The shared memory module 10 receives the request from the server controller 200 at the shared memory controller 100, and checks the added information with information related to the access authority stored in the shared memory module 10. In a case where valid authority is confirmed, processing of securement of the request memory and read/write of data is performed with respect to the shared memory 130, and returns information corresponding to the processing to the server 20.

Specifically, first, the program, which is executed by the processor 230, make a request for use of the shared memory 130. At this time, an address on the shared memory 130 which is desired to use may be designated, or only a memory quantity that is desired to use may be designated. The former is used in a case of desiring to use data that is written already by another program, and the latter is used in a case of desiring to secure a completely new region.

The server controller 200 generates a use request including information that is necessary for authentication of the program in response to the request of the program, and transmits the use request to the shared memory module 10. The shared memory controller 100 receives the use request form the server 20, and performs authentication of the program. In addition, in a case where an address is designated, the shared memory controller 100 makes a determination on validity of the use request by checking whether the program has authority for using the address. When the use request is valid, the shared memory controller 100 returns an address range usable by the program and an access key for access to an address within the address range to the server 20.

The server controller 200 receives the address range usable by the program and the access key from the shared memory module 10, and stores the address range and the access key therein. Hereafter, in a case where access from the program executed by the processor 230 to the shared memory 130 is made, the server controller 200 adds the access key to a read/write command issued by the processor 230 to generate a read/write request, and transmits the read/write request to the shared memory module 10. The shared memory controller 100 receives the read/write request from the server 20, and confirms access authority by checking the address and the access key to determine validity of the read/write request. When the read/write request is valid, the shared memory controller 100 performs processing in response to the read/write request, and returns the processing result to the server 20 to permit read/write of data while retaining the access authority.

As described above, the memory sharing system of this embodiment manages the access authority to the shared memory 130 through authentication of the program, and in a case where the program actually accesses to the shared memory 130, the memory sharing system generates a temporal access key and uses it for determining whether the program has the access authority. Accordingly, even in a case where the same program is distributed and executed while performing global access authority management, it is possible to safely separate individual shared memory spaces.

Hereinafter, description will be given of details of the server controller 200 and the shared memory controller 100. In the following description, as a data structure of information in which two or more pieces of data are associated with each other, a data structure in a table form in which values are associated with each other is exemplified, but there is no limitation thereto. For example, a structure of storing data by using a binary tree, or a structure of storing data by a method called range leveling are also possible.

Figures 2, 3:
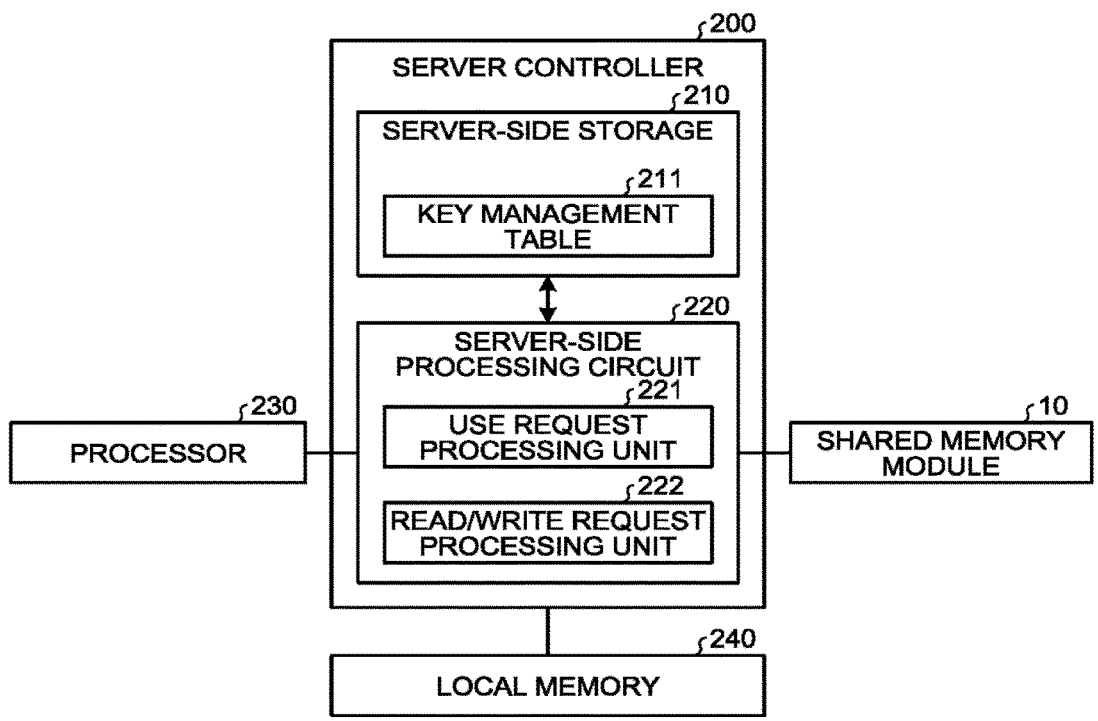
FIG. 2 is a block diagram illustrating a configuration example of a server controller.
FIG. 3 is a view illustrating an example of a key management table.

First, description will be given of a configuration of the server controller 200. FIG. 2 is a block diagram illustrating a configuration example of the server controller 200. As illustrated in FIG. 2, the server controller 200 includes a server-side storage 210 and a server-side processing circuit 220. The server-side storage 210 stores a key management table 211 (key management information). The server-side processing circuit 220 includes a use request processing unit 221 (server-side use request processing unit) and a read/write request processing unit 222 (server-side read/write request processing unit).

The key management table 211 is a table in which the access key generated in response to the use request and a usable address range are associated with each other. An example of the key management table 211 is illustrated in FIG. 3. Since the access key is a temporal key as described above, in a case where execution of the program by the processor 230 is terminated, the access key and the address range, which are registered in the key management table 211, may be erased.

The use request processing unit 221 of the server-side processing circuit 220 is a processing unit that performs server-side processing related to the use request. When the processor 230 makes a request for securement of a memory for which an address or a memory quantity which the executed program desires to use is designated, and a command for securement of the memory is issued from the processor 230, the use request processing unit 221 acquires a program ID that is an identifier peculiar to the program that makes a request for securement of the memory, and authentication information for authentication of the program from the program. In addition, the use request processing unit 221 generates a use request including the program ID and the authentication information which are acquired from the program, and transmits the generated use request to the shared memory module 10.

It is not always necessary for the information such as the program ID and the authentication information, which are used to generate the use request, to be acquired from the program. For example, a memory management sub-system of the OS or the like may automatically add these pieces of information at a time of memory securement.

When receiving the access key and the usable address range from the shared memory module 10 as a response to the use request transmitted to the shared memory module 10, the use request processing unit 221 registers the access key and the usable address range thus received in the key management table 211 in correlation with each other. When receiving an error notification from the shared memory module 10 as a response to the use request transmitted to the shared memory module 10, the use request processing unit 221 notifies the processor 230 of the error.

FIGS. 4A and 4B illustrate examples of a data structure of the use request is illustrated in. FIG. 4A illustrates a data structure of a use request including designation of an address that is desired to use, and FIG. 4B illustrates a data structure of a use request including designation of a memory quantity that is desired to use. For example, the use request, which is generated by the use request processing unit 221 and is transmitted to the shared memory module 10, includes designation of an address or a memory quantity which is desired to use, a program ID, and authentication information as illustrated in FIGS. 4A and 4B. The data structure of the use request which is exemplified in FIGS. 4A and 4B has a structure in which the program ID and the authentication information are added to a memory securement command that is issued by the processor 230 in response to the request from the program.

The read/write request processing unit 222 of the server-side processing circuit 220 is a processing unit that performs server-side processing related to the read/write request. When the program executed by the processor 230 makes a request for read/write of data, and a read/write command is issued from the processor 230, the read/write request processing unit 222 refers to the key management table 211 and acquires the access key, which is associated with the address range including a data read/write address (target address) included in the read/write command, from the key management table 211. The read/write request processing unit 222 generates a read/write request including the target address included in the read/write command, and the access key acquired form the key management table 211, and transmits the read/write request to the shared memory module 10.

When receiving data, which is read out from the shared memory 130, from the shared memory module 10 as a response to the read/write request (request for reading-out of data) transmitted to the shared memory module 10, the read/write request processing unit 222 returns the received data to the processor 230. When receiving a normal termination notification, which indicates that writing of data is normally terminated, from the shared memory module 10 as a response to the read/write request (request for writing of data) transmitted to the shared memory module 10, the read/write request processing unit 222 notifies the processor 230 of normal termination. When receiving an error notification from the shared memory module 10 as a response to the read/write request transmitted to the shared memory module 10, the read/write request processing unit 222 notifies the processor 230 of the error.

FIG. 5 illustrates an example of the data structure of the read/write request. For example, as illustrated in FIG. 5, the read/write request, which is generated by the read/write request processing unit 222 and is transmitted to the shared memory module 10, includes a type indicating either reading-out or writing, a target address, and an access key. In a case where the read/write request is a request for writing of data, the read/write request further includes writing data. In the data structure of the read/write request illustrated in FIG. 5, an access key is added to the read/write command issued by the processor 230 in response to a request from the program.

In a case where the target address included in the read/write command issued by the processor 230 is an address of the local memory 240, the read/write request processing unit 222 may execute reading-out or writing of data with respect to the local memory 240 in response to the read/write command issued by the processor 230. In a case where a memory management unit of the OS or the like determines in advance whether an access destination is the local memory 240 or the shared memory 130, and only a request for the shared memory 130 is transmitted to the server controller 200, reading-out or writing of data with respect to the local memory 240 is performed by a memory controller different from the server controller 200, and thus read/write processing for the local memory 240 by the read/write request processing unit 222 becomes not necessary.

Figures 6, 7:
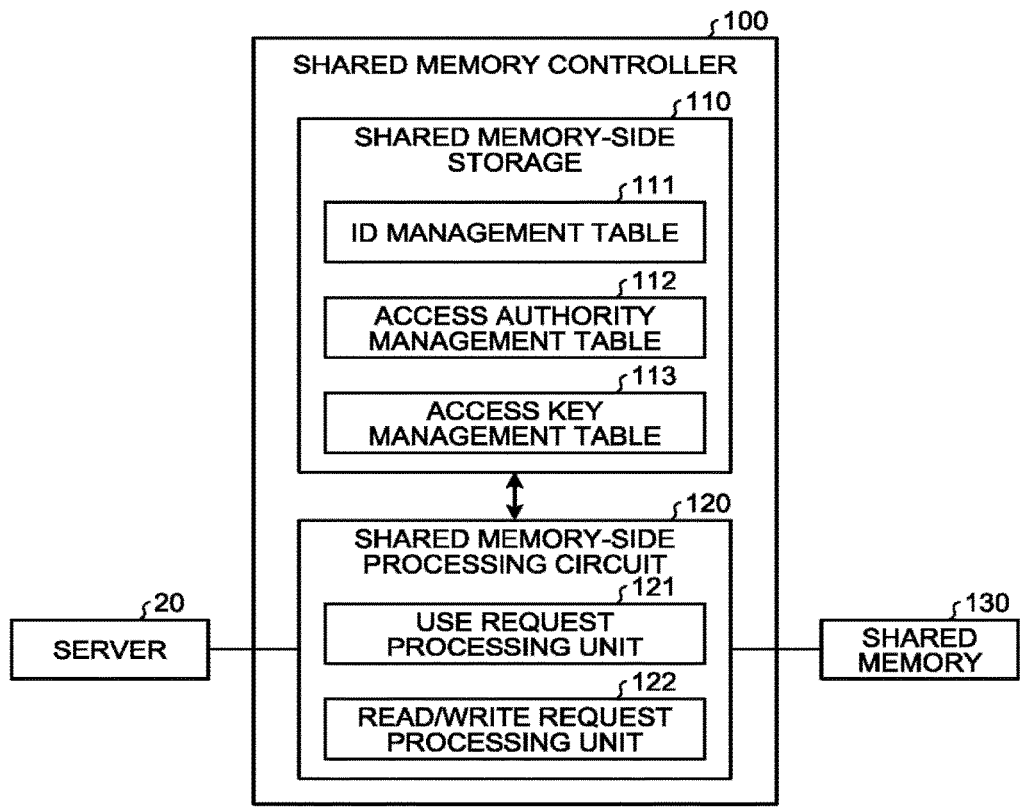
FIG. 6 is a block diagram illustrating a configuration example of a shared memory controller.
FIG. 7 is a view illustrating an example of an ID management table.

Next, description will be given of a configuration of the shared memory controller 100. FIG. 6 is a block diagram illustrating a configuration example of the shared memory controller 100. As illustrated in FIG. 6, the shared memory controller 100 includes a shared memory-side storage 110 and a shared memory-side processing circuit 120. The shared memory-side storage 110 stores an ID management table 111 (ID management information), an access authority management table 112 (access authority management information), and an access key management table 113 (access key management information). The shared memory-side processing circuit 120 includes a use request processing unit 121 (shared memory-side use request processing unit) and a read/write request processing unit 122 (shared memory-side read/write request processing unit).

The use request processing unit 121 and the read/write request processing unit 122 of the shared memory-side processing circuit 120 is implemented by, for example, one or a plurality of processors. For example, the use request processing unit 121 and the read/write request processing unit 122 may be implemented by executing a program by a processor such as a CPU, that is, by software, may be implemented by a processor such as an exclusive integrated circuit (IC), that is, by hardware, or may be implemented in combination of software and hardware.

The ID management table 111 is a table in which a program ID of a program registered as a program that uses the shared memory 130, and authentication information (security information) for authentication of the program are associated with each other. FIG. 7 illustrates an example of the ID management table 111. The program ID may be information that is peculiar to the program or a program name. Alternatively, a valid ID for the memory sharing system of this embodiment may be generated to be used as a program ID. The authentication information may be an arbitrary password, or a public key that is used in public key authentication.

The access authority management table 112 is used for determining an address range to which a program registered in the ID management table 111 is permitted to access. In the access authority management table 112, the address range and a program ID of a program that is permitted to access the address range are associated with each other. FIG. 8 illustrates an example of the access authority management table 112. Here, the address range designates a certain range in a memory of the shared memory 130, and is variable in accordance with an expression method of a memory space of the shared memory 130. For example, in a case of a linear memory space, as illustrated in FIG. 8, the address range can be expressed by an integer value range indicating a typical memory address, or by a pair of the integer value and a memory length (memory quantity). In a case where the memory space is mapped in a directory structure like a file system, the address range may be expressed to indicate a location in a hierarchic structure like a file path. The access authority management table 112 may also be called definition of permission on a memory region that is expressed as described above.

In this embodiment, it is assumed that an operation (addition or deletion of registration) with respect to the ID management table 111 is separately performed. A special contrivance is not necessary for the operation of the ID management table 111 as long as the program ID and the authentication information can be edited through processing similar to user registration in an existing service. This is also true of the access authority management table 112. Edition of an address range and the program ID (shared information) of the program that is permitted to access the address range may be performed by means of typical access management (change of permission on a file system, on-line storage edition authority management, and the like). Hereinafter, description will be made on the assumption that the ID management table 111 is given. With regard to the access authority management table 112, shared information may be added through processing in response to the use request as to be described later, but description will be made on the assumption that shared information is basically set to a certain extent.

The access key management table 113 is a table in which the same address range as in the access authority management table 112, and an address key for access to an address within the address range are associated with each other. FIG. 9 illustrates an example of the access key management table 113. The access key has a data structure that is less likely to be estimated by another person, and is guaranteed to be unique to a certain extent. For example, a character string, which is generated by applying data indicating information peculiar to the shared memory controller 100 and date to a hash function, can be used as the access key. Since the access key is a temporal key as described above, in a case where an apparent notification indicating termination of program execution is given from the server 20, or in a case where a communication with the server 20 is continuously paused for a certain time, and the like, the access key and the address range which are registered in the access key management table 113 may be erased.

The use request processing unit 121 of the shared memory-side processing circuit 120 is a processing unit that performs processing on the shared memory module 10 side related to the above-described use request. When the shared memory module 10 receives the use request transmitted from the server 20, the use request processing unit 121 makes a determination on validity of the use request that is received with reference to the ID management table 111 and the access authority management table 112. When the use request is valid, the use request processing unit 121 generates an access key, and registers the generated access key in the access key management table 113 in association with a usable address range, and returns the generated access key and the usable address range to the server 20, which is a transmission source of the use request, as a response to the use request. When the use request is not valid, the use request processing unit 121 returns an error notification to the server 20, which is the transmission source of the use request, as the response to the use request.

As described above, examples of the use request include two kinds of use requests, that is, a use request including designation of an address that is desired to use, and a use request including designation of a memory quantity that is desired to use. The processing by the use request processing unit 121 of the shared memory-side processing circuit 120 becomes different depending on the kinds of the use request.

When receiving the use request including designation of the address that is desired to use, in a case where a combination of the program ID included in the received use request, and the authentication information is registered in the ID management table 111, and an address that is designated in the received use request is included in the address range that is registered in the access authority management table 112 in association with the program ID included in the use request, the use request processing unit 121 determines that the received use request is valid. The use request processing unit 121 sets the address range, which is registered in the access authority management table 112 in association with the program ID included in the use request, as a usable address range, and returns the useable address range to the server 20 that is the transmission source of the use request together with the access key that is generated.

When receiving the use request including designation of the memory quantity that is desired to use, in a case where the combination of the program ID and the authentication information, which are included in the received use request, is registered in the ID management table 111, the use request processing unit 121 determines that the received use request is valid. Then, the use request processing unit 121 newly sets an address range corresponding to the memory quantity that is designated in the received use request, and registers the newly-set address range and the program ID included in the received use request in the access authority management table 112 as new shared information in association with each other. The use request processing unit 121 sets the newly-set address range as a usable address range, and returns the usable address range to the server 20 that is the transmission source of the use request together with the generated access key.

The read/write request processing unit 122 of the shared memory-side processing circuit 120 is a processing unit that performs processing on the shared memory module 10 side related to the above-described read/write request. When the shared memory module 10 receives the read/write request transmitted from the server 20, the read/write request processing unit 122 makes a determination on validity of the received read/write request with reference to the access key management table 113. Specifically, in a case where a combination of the access key included in the received read/write request, and the address range including the target address included in the received read/write request is registered in the access key management table 113, the read/write request processing unit 122 determines that the received read/write request is valid. In a case where the read/write request is valid, the read/write request processing unit 122 executes read/write of data with respect to the target address of the shared memory 130. In a case where the read/write request indicates reading-out of data, the read/write request processing unit 122 returns the read-out data to the server 20 that is the transmission source of the read/write request as a response to the read/write request. In a case where the read/write request indicates writing of data, when writing of data is completed, the read/write request processing unit 122 returns a normal termination notification indicating that writing of data is normally terminated to the server 20 that is the transmission source of the read/write request. In a case where the read/write request is not valid or in a case where read/write of data is not normally performed, the read/write request processing unit 122 returns an error notification to the server 20 that is the transmission source of the read/write request.

Next, description will be given of the operation of the server controller 200 and the shared memory controller 100 with reference to flowcharts in FIG. 10 to FIG. 13.

Figure 10:
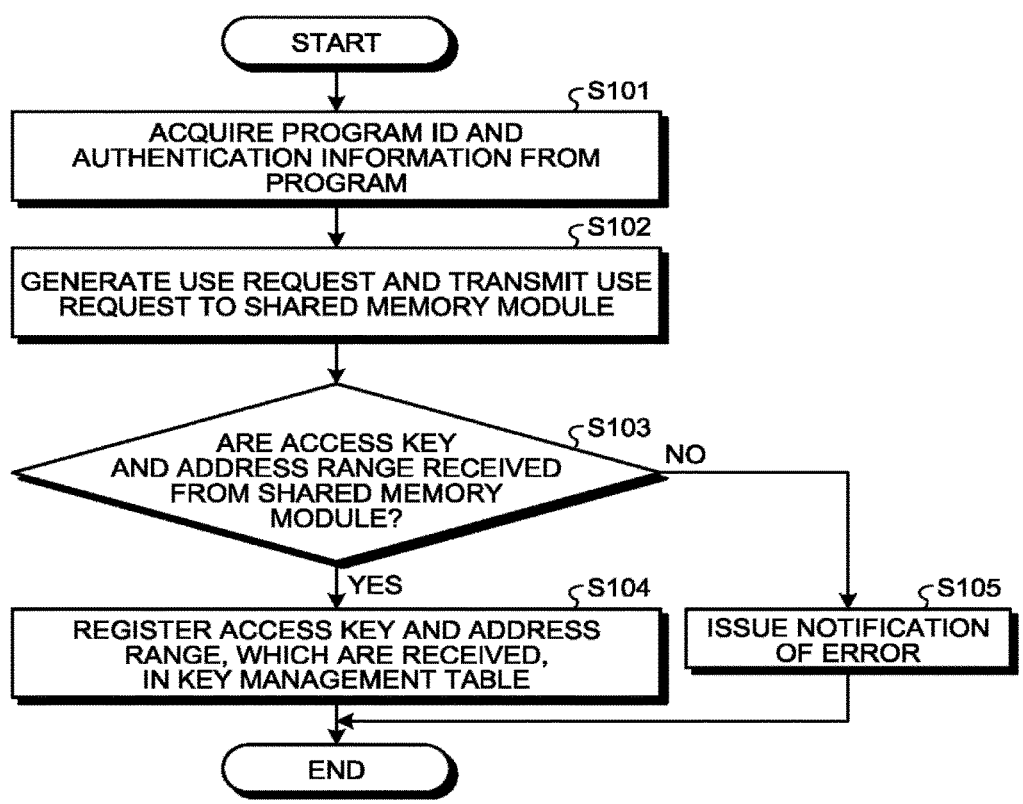
FIG. 10 is a flowchart illustrating an example of a procedure by a use request processing unit of the server controller.

First, the operation of the server controller 200 will be described. FIG. 10 is a flowchart illustrating an example of a procedure by the use request processing unit 221 of the server controller 200. A series of processing illustrated in the flowchart of FIG. 10 starts when a program executed by the processor 230 makes a request for memory securement, and a command for the memory securement is issued from the processor 230.

When the command for the memory securement is issued from the processor 230, the use request processing unit 221 acquires a program ID and authentication information from the program (step S101). Then, the use request processing unit 221 generates a use request including designation of an address or designation of a memory quantity which is included in the command of the memory securement from the processor 230, and the program ID and the authentication information which are acquired in step S101, and transmits the generated use request to the shared memory module 10 (step S102).

When it is determined that the use request transmitted to the shared memory module 10 is valid, an access key and an address range are returned from the shared memory module 10. When it is determined that the use request is not valid, an error notification is returned from the shared memory module 10. When receiving the access key and the address range from the shared memory module 10 (step S103: Yes), the use request processing unit 221 registers the access key and the address range thus received in a key management table in association with each other (step S104), and terminates the processing. When receiving the error notification from the shared memory module 10 (step S103: No), the use request processing unit 221 notifies the processor 230 of the error (step S105), and terminates the processing.

Figure 11:
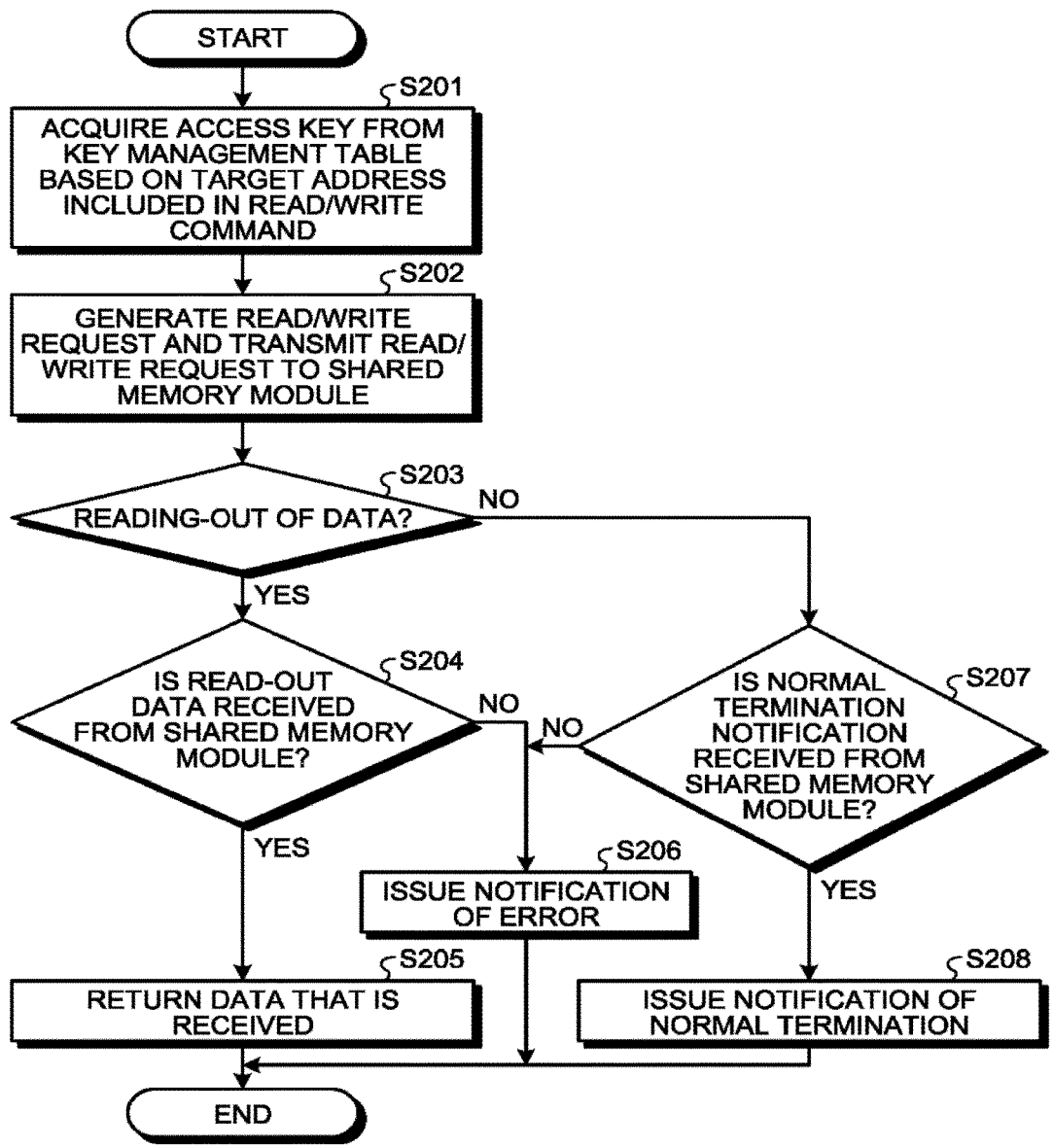
FIG. 11 is a flowchart illustrating an example of a procedure by read/write request processing unit of the server controller.

FIG. 11 is a flowchart illustrating an example of a procedure by the read/write request processing unit 222 of the server controller 200. A series of processing illustrated in the flowchart of FIG. 11 starts when a program executed by the processor 230 makes a request for read/write of data, and a read/write command is issued from the processor 230.

When the read/write command is issued from the processor 230, the read/write request processing unit 222 acquires an access key from the key management table 211 based on a target address included in the read/write command (step S201). Then, the read/write request processing unit 222 adds the access key acquired in step S201 to the read/write command issued from the processor 230 to generate a read/write request, and transmits the generated read/write request to the shared memory module 10 (step S202).

When it is determined that the read/write request transmitted to the shared memory module 10 is valid, if the read/write request indicates reading-out of data, data, which is read-out from the shared memory 130, is returned from the shared memory module 10. If the read/write request indicates writing of data, a normal termination notification is returned from the shared memory 130. In addition, in a case where it is determined that the read/write request transmitted to the shared memory module 10 is not valid, or in a case where read/write of data is not normally performed, an error notification is returned from the shared memory module 10.

In a case where the read/write request indicates reading-out of data (step S203: Yes), when receiving the data, which is read-out from the shared memory 130, from the shared memory module 10 (step S204: Yes), the read/write request processing unit 222 returns the received data to the processor 230 (step S205), and terminates the processing. When receiving the error notification from the shared memory module 10 (step S204: No), the read/write request processing unit 222 notifies the processor 230 of the error (step S206), and terminates the processing.

In a case where the read/write request indicates writing of data (step S203: No), when receiving a normal termination notification from the shared memory module 10 (step S207: Yes), the read/write request processing unit 222 notifies the processor 230 of the normal termination (step S208), and terminates the processing. When receiving an error notification from the shared memory module 10 (step S207: No), the read/write request processing unit 222 notifies the processor 230 of the error (step S206), and terminates the processing.

Figure 12:
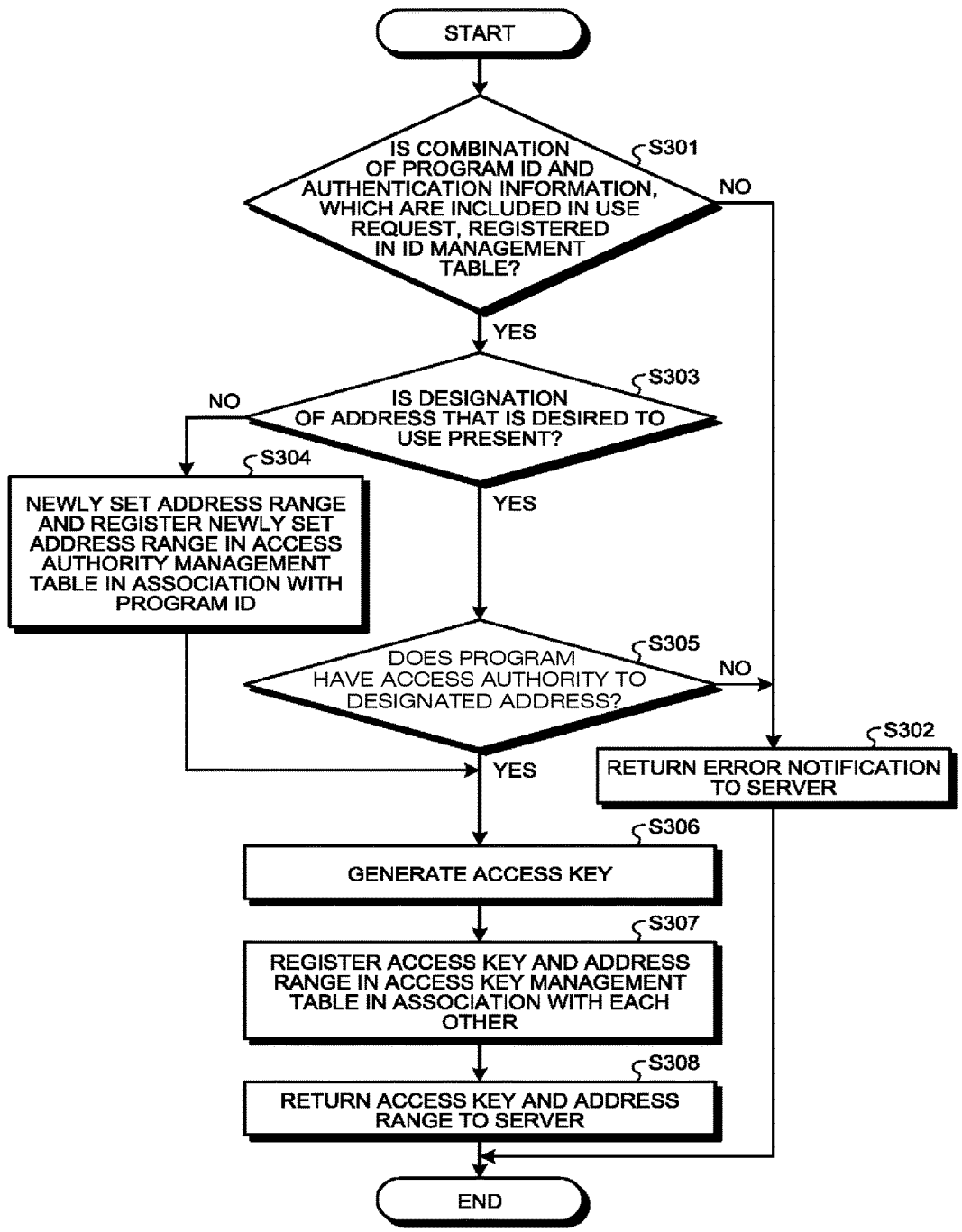
FIG. 12 is a flowchart illustrating an example of a procedure by a use request processing unit of the shared memory controller.

Next, the operation of the shared memory controller 100 will be described. FIG. 12 is a flowchart illustrating an example of a procedure by the use request processing unit 121 of the shared memory controller 100. A series of processing illustrated in the flowchart of FIG. 12 starts when a use request transmitted from the server 20 is received by the shared memory module 10.

When the shared memory module 10 receives the use request, first, the use request processing unit 121 determines whether or not a combination of the program ID and the authentication information, which are included in the received use request, is registered in the ID management table 111 (step S301). In a case where the combination of the program ID and the authentication information, which are included in the use request, is not registered in the ID management table 111 (step S301: No), the use request processing unit 121 determines that the use request is not valid, returns an error notification to the server 20 (step S302), and terminates the processing.

In a case where the combination of the program ID and the authentication information, which are included in the use request, is registered in the ID management table 111 (step S301: Yes), the use request processing unit 121 subsequently determines whether or not designation of an address, which is desired to use in the use request, is present in the use request (step S303). In a case where the designation of the address that is desired to use is not present, that is, only a memory quantity that is desired to use is designated (step S303: No), the use request processing unit 121 newly sets an address range corresponding to the memory quantity, and registers the address range in the access authority management table 112 in association with the program ID included in the use request (step S304). Then, the processing proceeds to step S306.

In a case where the designation of the address that is desired to use is present in the use request (step S303: Yes), the use request processing unit 121 subsequently confirms whether or not the address designated in the use request is included in the address range that is registered in the access authority management table 112 in association with the program ID included in the use request, and determines whether or not access authority to the address is present (step S305). In a case where it is determined that the access authority to the address designated in the use request is not present (step S305: No), the use request processing unit 121 determines that the use request is not valid, returns an error notification to the server 20 (step S302), and terminates the processing. In a case where it is determined that the access authority to the address designated in the use request is present (step S305: Yes), the processing proceeds to subsequent step S306.

Next, the use request processing unit 121 generates an access key for access to the address in the address range registered in the access authority management table 112 in association with the program ID included in the use request (step S306). In addition, the use request processing unit 121 registers the access key generated in step S306 and the address range to which access is possible with the access key in the access key management table 113 in association with each other (step S307), returns the access key and the address range to the server 20 (step S308), and terminates the processing.

Figure 13:
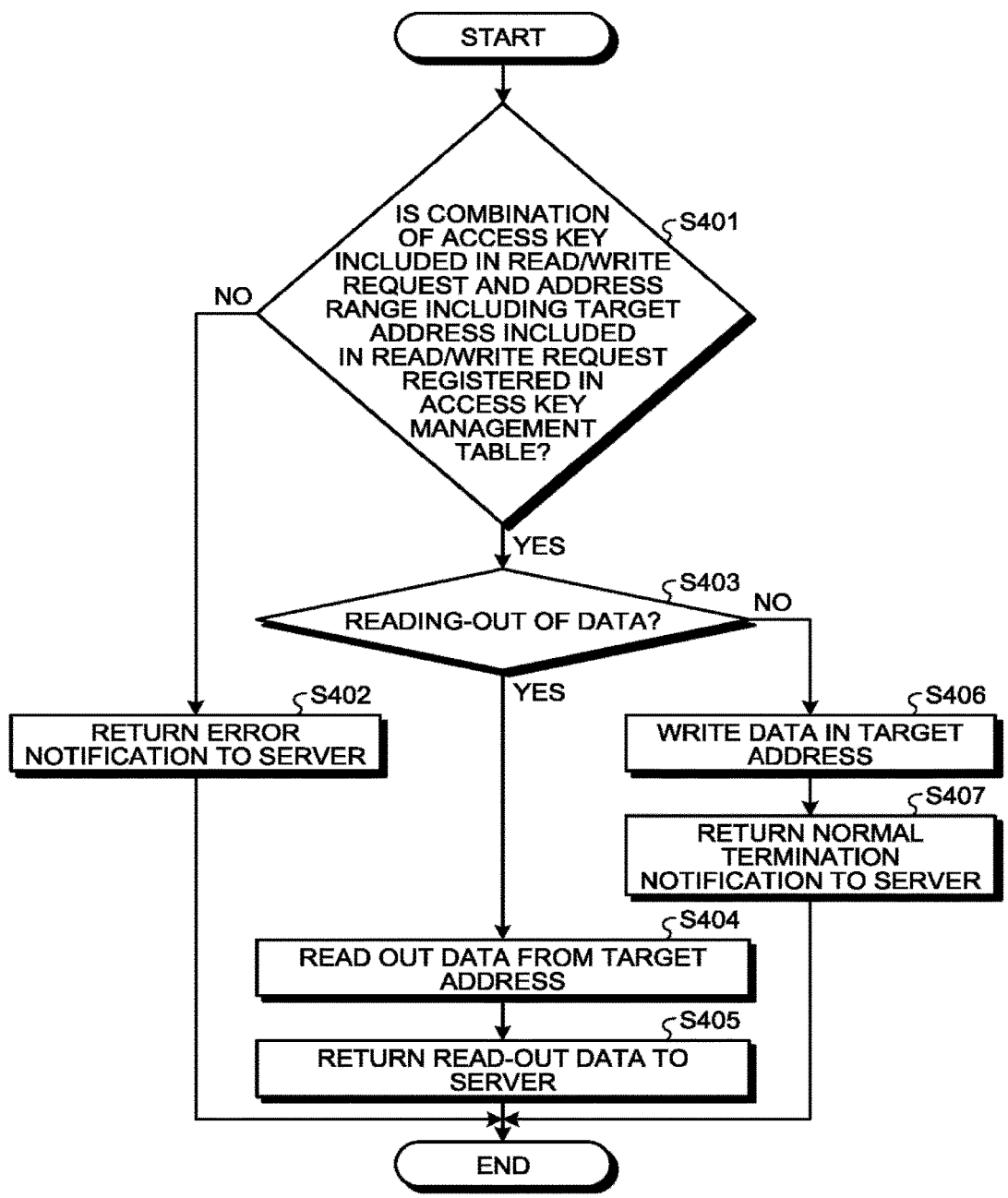
FIG. 13 is a flowchart illustrating an example of a procedure by a read/write request processing unit of the shared memory controller.

FIG. 13 is a flowchart illustrating an example of a procedure by the read/write request processing unit 122 of the shared memory controller 100. A series of processing illustrated in the flowchart of FIG. 13 starts when the read/write request transmitted from the server 20 is received by the shared memory module 10.

When the shared memory module 10 receives the read/write request, first, the read/write request processing unit 122 determines whether or not a combination of an access key included in the received read/write request and an address range including a target address included in the read/write request is registered in the access key management table 113 (step S401). In a case where the combination of the access key included in the read/write request and the address range including the target address included in the read/write request is not registered in the access key management table 113 (step S401: No), the read/write request processing unit 122 determines that the read/write request is not valid, returns an error notification to the server 20 (step S402), and terminates the processing.

In a case where the combination of the access key included in the read/write request and the address range including the target address included in the read/write request is registered in the access key management table 113 (step S401: Yes), the read/write request processing unit 122 executes read/write of data with respect to the shared memory 130 in response to the received read/write request. That is, in a case where the read/write request indicates reading-out of data (step S403: Yes), the read/write request processing unit 122 reads out data from the target address of the shared memory 130 (step S404), returns the read-out data to the server 20 (step S405), and terminates the processing. In a case where read/write request indicates writing of data (step S403: No), the read/write request processing unit 122 writes data in the target address of the shared memory 130 (step S406), returns a normal termination notification to the server 20 (step S407), and terminates the processing.

Hereinbefore, as described above with reference to specific examples, in this embodiment, the shared memory controller 100 generates an access key in response to a use request received form the server 20, and returns the access key and a usable address range to the server 20. In a case where the server 20 actually performs read/write of data with respect to the shared memory 130, the server controller 200 transmits a read/write request in which an access key is added to a read/write command of the processor 230 to the shared memory module 10. Then, the shared memory controller 100 checks access authority by using the access key included in the read/write request, and in a case where the access authority is present, the read/write of data with respect to the shared memory 130 is executed. According to this embodiment, it is possible to access the shared memory 130 at the same granularity as the granularity of a typical read/write command of the processor 230, and it is possible to appropriately perform an access control with respect to the shared memory 130.

In addition, according to this embodiment, since a program ID is used in management of access authority to the shared memory 130, even in a case where the same program is distributed and executed while performing global access authority management, it is possible to safely separate individual shared memory spaces.

First Modification Example

In the above-described embodiment, it is assumed that the server controller 200 is implemented as independent separate hardware. The server controller 200 corresponds to a function added to a typical server. As a method of implementing the server controller 200, various variations can be considered in addition to the implementation as the independent separate hardware. Hereinafter, description will be given of the variations of the method of implementing the server controller 200.

First, description will be given of an overview of memory management of an OS provided in a typical server. Generally, the OS manages a memory space of each process individually in such a manner that a memory space of a certain process is capable of being handled independently from memory spaces of other processes. On the process, access to a memory device is made through a virtual memory address (virtual address different from a physical address). In a case of actually accessing the memory device, it is necessary to convert the virtual memory address into an actual physical memory address (physical memory address), and this function is in charge of a page table on the memory management system of the OS. Simply, the page table is constituted by a correspondence table between the virtual memory address and the physical address. The page table is frequently provided in a memory management unit (MMU) in a processor so as to raise efficiency, and cache thereof is prepared as a translation lookaside buffer (TLB) in many cases for high-speed access. The memory management system of the OS performs access by linking the virtual memory space to the physical memory address in cooperation with functions of the memory management system. In addition, hardware called a memory controller exists between a processor and a memory device, and the memory controller converts a physical memory address into a lower-level signal, to thereby relay an operation with a specific memory device to transmit and receive data.

The server controller 200 corresponds to a function of enabling access to a remote memory (the shared memory 130 in this embodiment) by extending a function of a memory access portion of a typical server. It is therefore necessary for the server controller 200 to operate in cooperation with the memory management system of the OS in any manner. However, it is not always necessary for the function of the server controller 200 to be present in the OS as long as information necessary for an operation such as information of an address or a use request in memory access can be received from the OS, and a function of performing a communication with the shared memory module 10 is possible.

As a method of implementing the server controller 200 by extending the OS, the following method can be considered. That is, the page table or the TLB is extended so that a type indicating whether the virtual memory address corresponds to the local memory 240 or the remote shared memory 130, and an access key can be registered, so as to provide a function of the key management table 211. In this case, the memory management function of the OS is extended to add a function capable of making a use request for the shared memory module 10, and a function capable of performing a communication with the shared memory module 10, so as to cause the memory management function of the OS to function as the server controller 200. In a case of implementing the server controller 200 in this manner, the processor 230 issues a command of a use request (memory securement) for the shared memory 130 and a read/write command similar to typical memory access, and the extended memory management function of the OS, which has a function as the server controller 200, executes processing as the use request processing unit 221 and the read/write request processing unit 222.

As another method of implementing the server controller 200, the following method can be considered. That is, the server controller 200 is implemented as software capable of receiving information from the OS although the software is not a part of the OS. In this case, a software module that is in charge of a communication function with the key management table 211 and the shared memory module 10 is independently mounted and allowed to perform the communication function. At this time, there is necessity for extension of hooking occurrence of memory access to the memory management portion of the OS and notifying the software module of the hooking. When implementing the server controller 200 in this manner, in a case of a command of the use request (memory securement) for the shared memory 130, the processor 230 directly issues the command to the software module. In a case of the read/write command, the processor 230 notifies the software module of an address, data, and the like through the memory management portion of the extended OS. Hereafter, the software module executes processing as the use request processing unit 221 and the read/write request processing unit 222.

As still another method of implementing the server controller 200, a method of implementing the server controller 200 by extending a memory controller, which is hardware provided in a typical server, can also be considered. Typically, the memory controller is a device that receives a read/write request related to the physical memory address from the OS, and executes read/write. However, the memory controller is provided with a data region of the key management table 211, and a main function of the server controller 200. In addition, a portion of the OS, to which a memory of a memory management function is allocated, is extended, and an address is designated from the processor 230 to form an interface capable of issuing a command of use request (memory securement) for the shared memory 130. In addition, a memory address region indicating the shared memory 130 is determined in advance. According to this, the memory controller can make a determination whether processing is processing for the local memory 240 or processing for the shared memory 130 by using a typical memory access notification by determining whether a target address corresponds to either the local memory 240 or the shared memory 130. In a case where the server controller 200 is implemented in this manner, the processor 230 can issue the use request (memory securement) command for the shared memory 130 to the memory controller through a memory allocation mechanism. Hereafter, a typical read/write command is issued to the memory controller through the OS. In a case where a command of the processor 230 indicates processing with respect to the local memory 240, the memory controller may perform processing as is. In a case where the command of the processor 230 indicates processing with respect to the shared memory 130, the memory controller executes processing as the use request processing unit 221 and the read/write request processing unit 222.

Second Modification Example

As described above, the shared memory 130 in the shared memory module 10 may be constituted in combination of a plurality of memory devices, and it is also assumed that the shared memory 130 may be constituted in combination of memory devices which are different in performance. In a case where the use request received from the server 20 includes only designation of a memory quantity, if the use request is valid, the use request processing unit 121 of the shared memory controller 100 newly sets an address range, which corresponds to the memory quantity that is designated in the use request, in the shared memory 130. At this time, if it is possible to know a type of actual memory access that is performed after the use request, the newly-set address range can be arranged in a memory device suitable for the subsequent memory access.

Therefore, additional information, which indicates a type of scheduled access, may be included in the use request that is transmitted from the server 20 to the shared memory module 10. FIG. 14 illustrates an example of a data structure of the use request in this case. The use request illustrated in FIG. 14 has a data structure in which additional information is further added to the use request illustrated in FIG. 4B. The additional information is information indicating a type of scheduled access such as information indicating that only reading-out of data is scheduled, information indicating that both of reading-out and writing of data are scheduled, information indicating that sequential (continuous) access is dominant, and information indicating that random access is dominant, for example.

When the additional information is added to the use request, when newly setting an address range in response to the use request, the use request processing unit 121 of the shared memory controller 100 can arrange the newly-set address range in a memory device suitable for the memory access in the shared memory 130, and can optimize the memory arrangement.

Third Modification Example

In the above-described embodiment, it is assumed that access to the shared memory 130 is performed in one byte unit, but it can also be considered that a plurality of pieces of data is read or written at a time by one access. In this case, it is also possible to employ a configuration in which a data read/write address range is designated by a read/write request. FIG. 15 illustrates an example of a data structure of the read/write request in this case. The read/write request illustrated in FIG. 15 has a data structure in which a target address range indicating data read/write address range is included instead of the target address that is included in the read/write request illustrated in FIG. 5. When the read/write request has the above-described configuration, a plurality of pieces of data can be read out or written at a time through one access to the shared memory 130.

Second Embodiment

Next, a second embodiment will be described. The second embodiment corresponds to an example in which not only the shared memory 130 in the shared memory module 10 but also the local memory 240 in the server 20 are set as an object to be managed so as to raise memory management efficiency.

For example, it is assumed that data in a certain address range of the shared memory 130 is read out by the first server 20A, and is accessed and updated on the local memory 240 on the first server 20A. In this case, the latest data in the address range is present in the local memory 240 of the first server 20A. At this time, when the second server 20B makes a request for the shared memory module 10 to read out or write the data with respect to the same address range, in a typical structure, the shared memory module 10 waits that the first server 20A rewrites the latest data in the shared memory 130, and responds to a request from the second server 20B because only old data is present on the shared memory 130.

If knowing that the latest data is present in the first server 20A, the shared memory module 10 can give an instruction for the second server 20B to directly access the latest data in the first server 20A. According to this, when the second server 20B makes a request for the first server 20A to read or write data, it is possible to shorten waiting time, and it is possible to suppress the quantity of data transmitted to the minimum. Therefore, in this embodiment, the shared memory controller 100 of the shared memory module 10 and the server controller 200 of the server 20 are provided with a function that implements the processing as described above.

In the shared memory controller 100 in this embodiment, the shared memory-side storage 110 additionally stores a lending table 114 as illustrated in FIG. 16 in addition to the ID management table 111, the access authority management table 112, and the access key management table 113.

As illustrated in FIG. 16, the lending table 114 is a table in which an address range of the shared memory 130 from which data is read out in response to a request of the server 20, and an address (for example, an IP address) of the server 20 that is a transmission destination of the read-out data are associated with each other, and indicates that data in which address range of the shared memory 130 is transmitted to which server 20 (i.e., data is read out by which server 20). When referring to the lending table 114, it is possible to know that the latest state of data on the shared memory 130 is (may be) on the local memory 240 of which server 20. Furthermore, an expression method of an address of the server 20 is not limited to the IP address as long as the location of the server 20 can be specified, and may be, for example, a host name, a path expression in a network, and the like.

For example, in a case of reading out data from a certain address range of the shared memory 130 and transmitting the data to the first server 20A in response to a read/write request from the first server 20A, the read/write request processing unit 122 of the shared memory controller 100 records an address range from which data is read out, and an address of the first server 20A (server 20 that transmits data) in the lending table 114. Then, a use request, which designates the same address range, is transmitted from the second server 20B, the use request processing unit 121 of the shared memory controller 100 knows that data in the designated address range is present in the first server 20A with reference to the lending table 114. After confirming that the use request from the second server 20B is valid, the use request processing unit 121 generates an access key, returns the generated access key, the address range, and an address of the first server 20A (server 20 that is an access destination) to the second server 20B, and transmits the generated access key, the address range, and an instruction to accept access from the second server 20B to the first server 20A.

In the server controller 200 in this embodiment, the server-side storage 210 stores an extended key management table 212 as illustrated in FIG. 17 instead of the key management table 211. In addition the server-side storage 210 further stores an acceptance key management table 213 as illustrated in FIG. 18.

As illustrated in FIG. 17, the extended key management table 212 is a table in which an access key that is generated in response to a use request, an address range, and an address (for example, an IP address) of the server 20 that is an access destination are associated with each other, and the key management table 211 described in the first embodiment is extended so that the address of the server 20 that is an access destination can be registered. As described above, the address of the server 20 that is an access destination may be expressed by a host name, a path expression in a network, and the like without being limited to the IP address. In a case where the address of the server 20 that is an access destination is not transmitted from the shared memory module 10 and only an access key and an address range are transmitted as a response to the use request, an address of the shared memory module 10 is registered in the address of the server 20 that is an access destination.

As illustrated in FIG. 18, the acceptance key management table 213 is a table in which an instruction to accept access from another server 20, and the address range and the access key which are transmitted from the shared memory module 10 are associated with each other. The acceptance key management table 213 is basically the same as the access key management table 113 of the shared memory controller 100, and is used to determine validity of a read/write request from the other server 20.

When receiving the access key, the address range, and the address of the server 20 that is an access destination from the shared memory module 10 as a response to the use request, the use request processing unit 221 of the server controller 200 registers the access key, the address range, and the address of the server 20 that is an access destination thus received, in the extended key management table 212 in association with each other. In addition, when receiving only the access key and the address range from the shared memory module 10 as a response to the use request, the use request processing unit 221 registers the access key and the address range thus received, and the address of the shared memory module 10 in the extended key management table 212 in association with each other.

To transmit the read/write request in response to a read/write command of the processor 230, the read/write request processing unit 222 of the server controller 200 refers to the extended key management table 212. Then, the read/write request processing unit 222 transmits the read/write request to the server 20 (may be the shared memory module 10 in some cases) that is an access destination registered in the extended key management table 212 in association with the address range including a target address of the read/write request. In a case of receiving an instruction to accept access from another server 20, from the shared memory module 10, upon receiving a read/write request from the other server 20, the read/write request processing unit 222 makes a determination on validity of the read/write request based on the acceptance key management table 213. When the read/write request is valid, the read/write request processing unit 222 executes read/write of data with respect to the target address of the local memory 240 in response to the read/write request.

Figure 19:
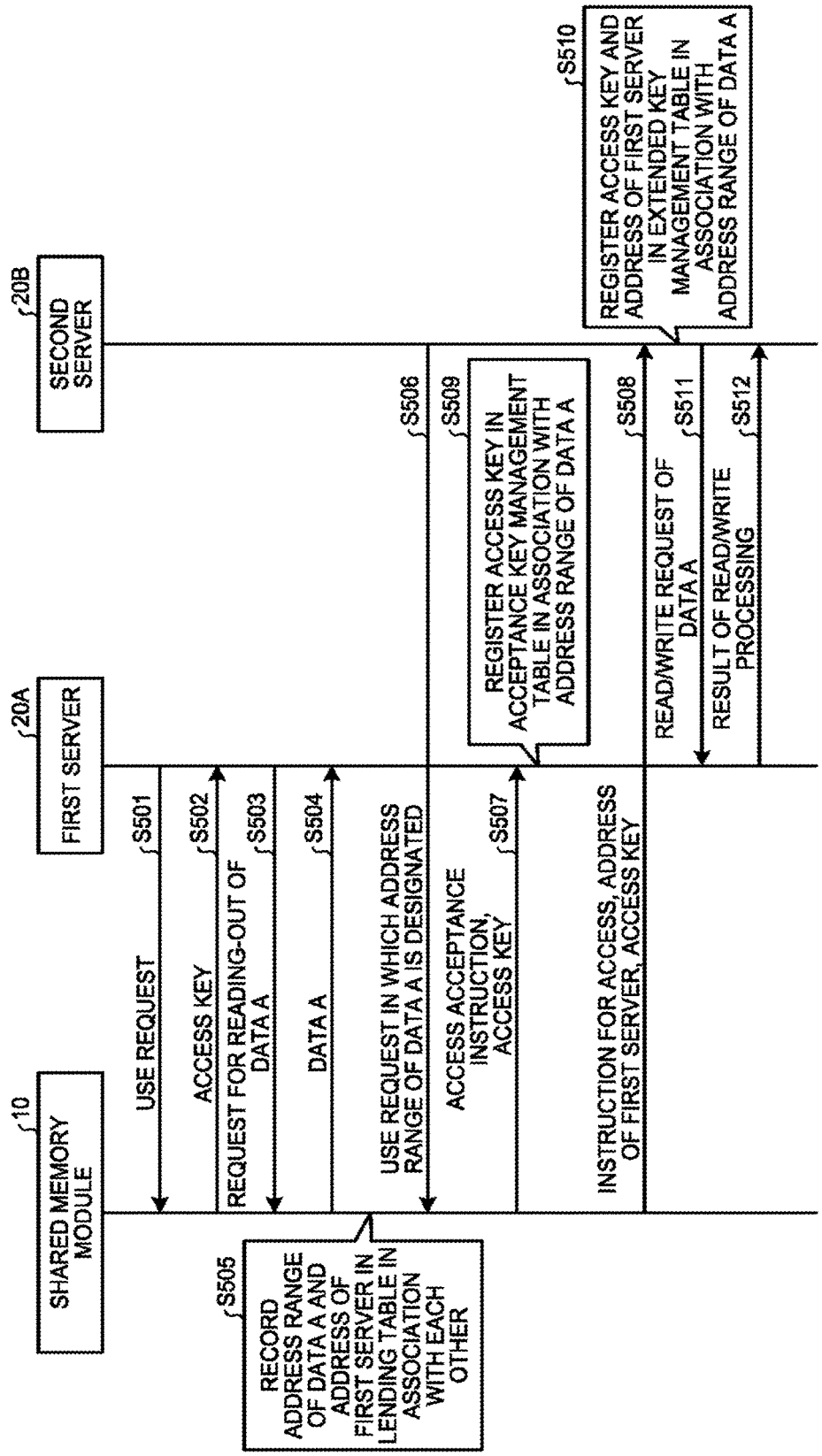
FIG. 19 is a sequence diagram illustrating an operation example of a second embodiment.

FIG. 19 is a sequence diagram illustrating an operation example of this embodiment. First, the first server 20A transmits a use request to the shared memory module 10 (step S501), and makes a request for reading-out of data in a certain address range (hereinafter, the data in the address range is referred to as "data A") (step S503) through transmission of an access key (step S502).

The shared memory module 10 reads out the data A from the shared memory 130 and transmits the data A to the first server 20A in response to the reading-out request of the first server 20A (step S504), and records the address range of the data A and an address of the first server 20A in the lending table 114 in association with each other (step S505).

Next, the second server 20B transmits a use request, in which the address range of the data A is designated, to the shared memory module 10 (step S506). At this time, when the shared memory module 10 performs the same processing as in the first embodiment, updating of the data A which is performed on the local memory 240 by the first server 20A, and updating of the data A which is performed on the shared memory 130 by the second server 20B may occur simultaneously, and thus there is a concern that consistency or compatibility may not be maintained in the data A. To avoid this situation, in a database and the like, change such as breakage of the consistency of data is prevented by using a mechanism such as lock. In contrast, in this embodiment, the shared memory module 10 knows that data in which address range is transmitted to which server 20 by using the lending table 114, and respective servers 20 can perform a data communication with each other by using the information to always access new data.

The shared memory module 10, which receives the use request from the second server 20B, confirms that the use request is valid, and then recognizes that the data A is lent to the first server 20A (transmitted to the first server 20A) with reference to the lending table 114. Then, the shared memory module 10 transmits an instruction to accept access from another server 20, and an access key for access to the data A on the local memory 240 of the first server 20A by the second server 20B to the first server 20A (step S507). The shared memory module 10 transmits an instruction for access to the first server 20A, an access key for access to the data A on the local memory 240 of the first server 20A by the second server 20B, and an address of the first server 20A to the second server 20B (step S508). The access key transmitted to the first server 20A and the access key transmitted to the second server 20B are the same as each other.

The first server 20A, which receives the access acceptance instruction and the access key from the shared memory module 10 registers the access key thus received, in the acceptance key management table 213 in association with the address range of the data A (step S509). The second server 20B, which receives the instruction for access to the first server 20A, and the access key, and the address of the first server 20A from the shared memory module 10, registers the access key and the address of the first server 20A thus received, in the extended key management table 212 in association with the address range of the data A (step S510).

In this manner, the second server 20B is ready to access the data A in the local memory 240 of the first server 20A, and therefore, the second server 20B can directly make a request for read/write with respect to the first server 20A without through the shared memory module 10. With regard to the read/write of data, the same processing as in the first embodiment is performed except that a reception side is the server controller 200 instead of the shared memory controller 100. Specifically, the server controller 200 of the second server 20B acquires an access key and an address of an access destination with reference to the extended key management table 212, and transmits a read/write request to the first server 20A that is an access destination (step S511). Then, when receiving the read/write request from the second server 20B, the first server 20A makes a determination on validity of the read/write request with reference to the acceptance key management table 213, and when the read/write request is valid, the first server 20A performs read/write processing with respect to an address range of the data A, and returns a result to the second server 20B (step S512).

Next, description will be given of the operation of the server controller 200 and the shared memory controller 100 in this embodiment with reference to flowcharts of FIG. 20 to FIG. 23.

Figure 20:
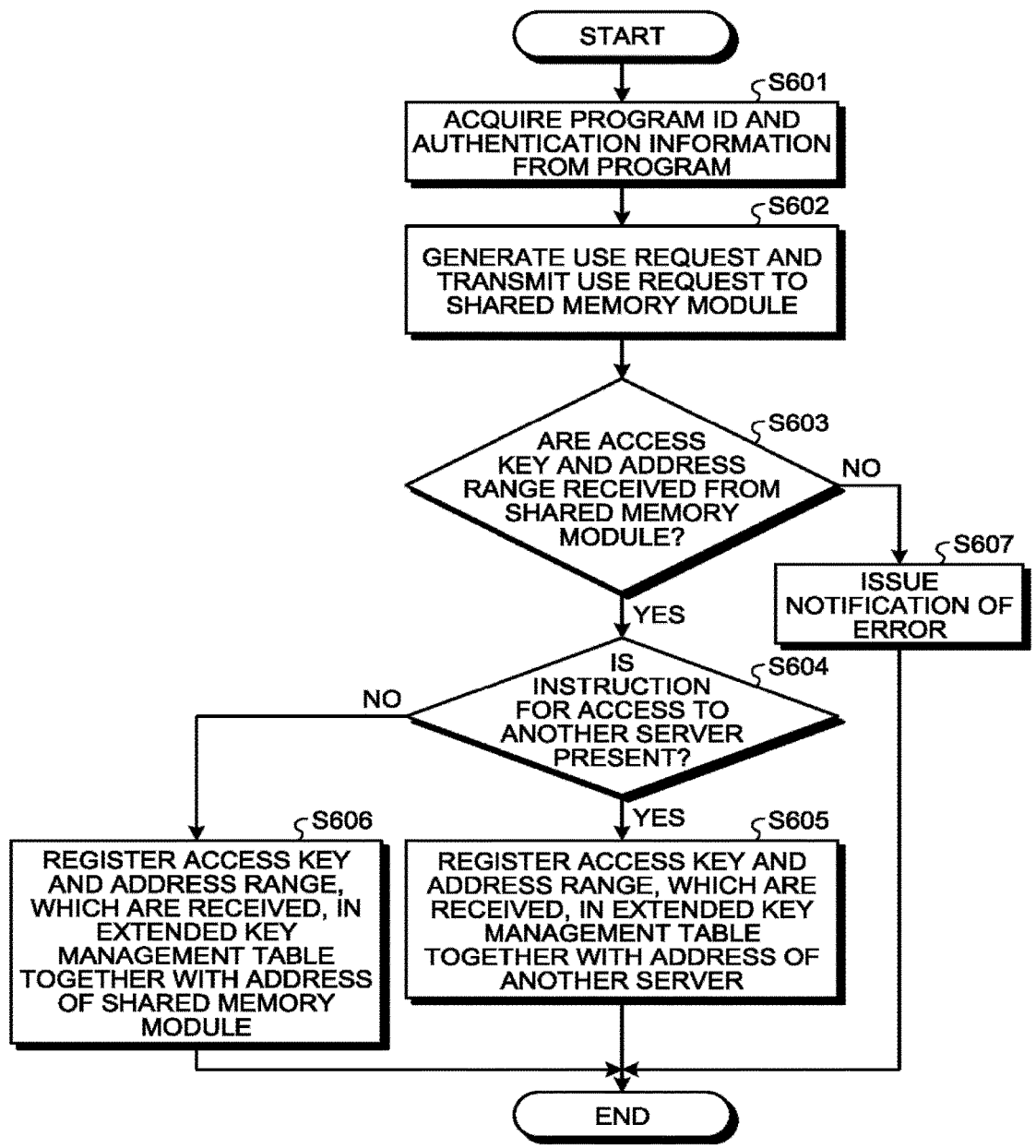
FIG. 20 is a flowchart illustrating an example of a procedure by the use request processing unit of the server controller.

First, the operation of the server controller 200 will be described. FIG. 20 is a flowchart illustrating an example of a procedure by the use request processing unit 221 of the server controller 200. A series of processing illustrated in the flowchart of FIG. 20 starts when the a program executed by the processor 230 makes a request for memory securement and a command of the memory securement is issued from the processor 230.

When the command for the memory securement is issued from the processor 230, the use request processing unit 221 acquires a program ID and authentication information from the program (step S601). Then, the use request processing unit 221 generates a use request including designation of an address or designation of a memory quantity included in the command of the memory securement from the processor 230, and the program ID and the authentication information which are acquired in step S601, and transmits the generated use request to the shared memory module 10 (step S602).

When it is determined that the use request transmitted to the shared memory module 10 is valid, an access key and an address range are returned from the shared memory module 10. When it is determined that the use request is not valid, an error notification is returned from the shared memory module 10. In a case where the use request includes designation of an address, and data of an address range including the address is present on the local memory 240 of another server 20, if the use request is valid, an instruction for access to the other server 20 and an address of the server 20 are transmitted from the shared memory module 10 in addition to the access key and the address range.

When receiving the access key and the address range from the shared memory module 10 (step S603: Yes), if an instruction for access to the other server 20 is present (step S604: Yes), the use request processing unit 221 registers the access key and the address range thus received, in the extended key management table 212 together with the address of the other server 20 (step S605). If the instruction for access to the other server 20 is not present (step S604: No), the use request processing unit 221 registers the access key and the address range thus received, in the extended key management table 212 together with an address of the shared memory module 10 (step S606). In a case of receiving an error notification from the shared memory module 10 (step S603: No), the use request processing unit 221 notifies the processor 230 of the error (step S607), and terminates the processing.

Figure 21:
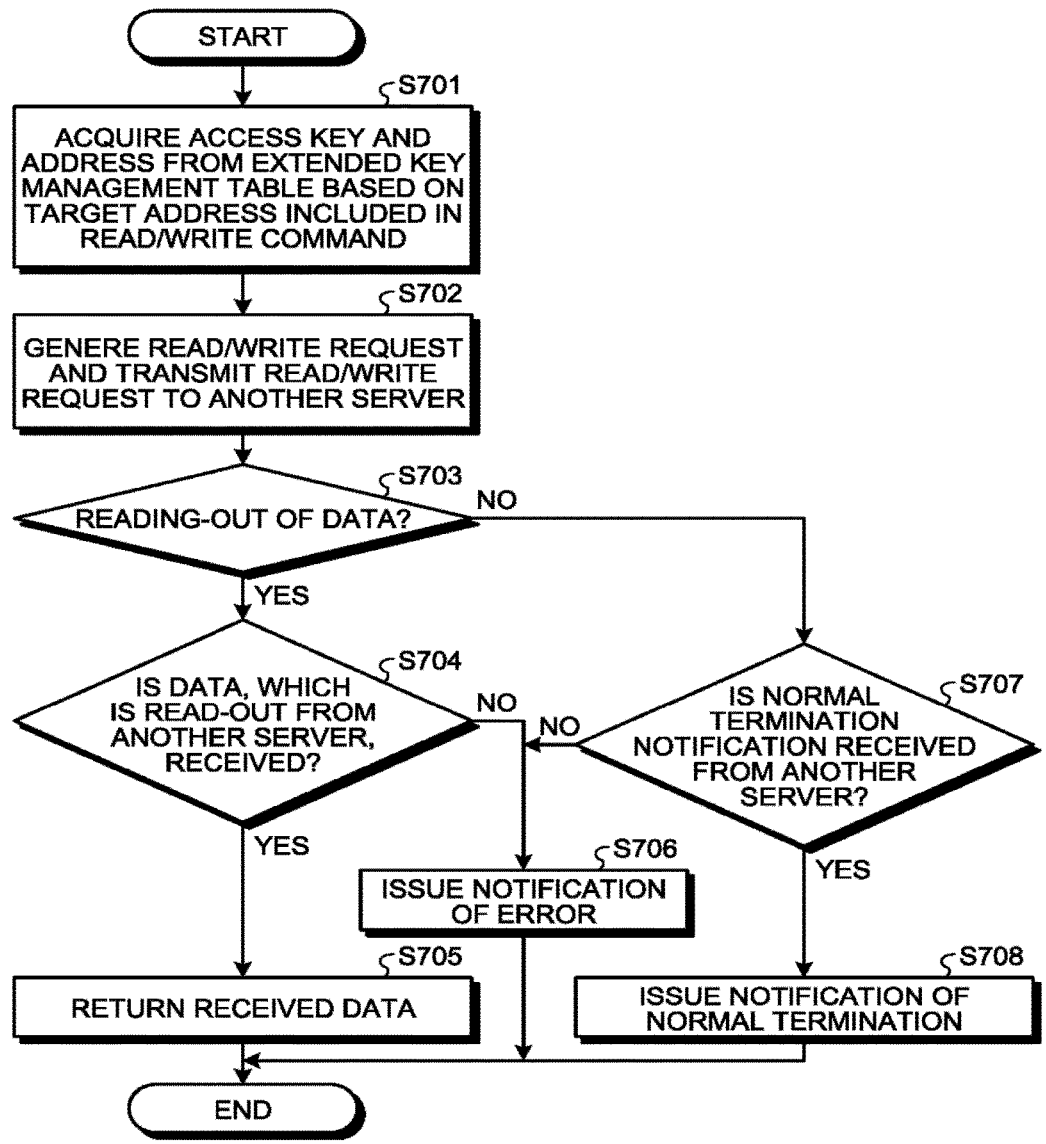
FIG. 21 is a flowchart illustrating an example of a procedure by the read/write request processing unit of the server controller.

FIG. 21 is a flowchart illustrating an example of a procedure by the read/write request processing unit 222 of the server controller 200, and particularly, a procedure in a case where a data read/write request is made for another server 20. A series processing illustrated in the flowchart of FIG. 21 starts when an instruction for access to the other server 20 is received from the shared memory module 10, an address of the other server 20 is registered in the extended key management table 212, a program executed by the processor 230 makes a request for read/write of data, and a read/write command is issued from the processor 230.

When the read/write command is issued from the processor 230, the read/write request processing unit 222 acquires an access key and an address of another server 20 that is an access destination from the extended key management table 212 based on a target address included in the read/write command (step S701). Then, the read/write request processing unit 222 adds the access key acquired in step S701 to the write command from the processor 230 to generate a read/write request, and transmits the generated read/write request to the other server 20 using the address acquired in step S701 as a receiver (step S702).

When it is determined that the read/write request transmitted to the other server 20 is valid, if the read/write request indicates reading-out of data, data, which is read-out from the local memory 240 of the other server 20 is returned to the other server 20. If the read/write request indicates a request for writing of data, a normal termination notification is returned from the local memory 240 of the other server 20. In a case where it is determined that the read/write request transmitted to the other server 20 is not valid, or in a case where read/write of data is not normally performed, an error notification is returned from the other server 20.

In a case where the read/write request indicates reading-out data (step S703: Yes), when receiving data, which is read out from the local memory 240 of the other server 20, from the other server 20 (step S704: Yes), the read/write request processing unit 222 returns the received data to the processor 230 (step S705), and terminates the processing. When receiving an error notification (step S704: No) from the other server 20, the read/write request processing unit 222 notifies the processor 230 of the error (step S706), and terminates the processing.

In a case where the read/write request indicates writing of data (step S703: No), when receiving a normal termination notification from the other server 20 (step S707: Yes), the read/write request processing unit 222 notifies the processor 230 of the normal termination (step S708), and terminates the processing. When receiving an error notification from the other server 20 (step S707: No), the read/write request processing unit 222 notifies the processor 230 of the error (step S706), and terminates the processing.

Figure 22:
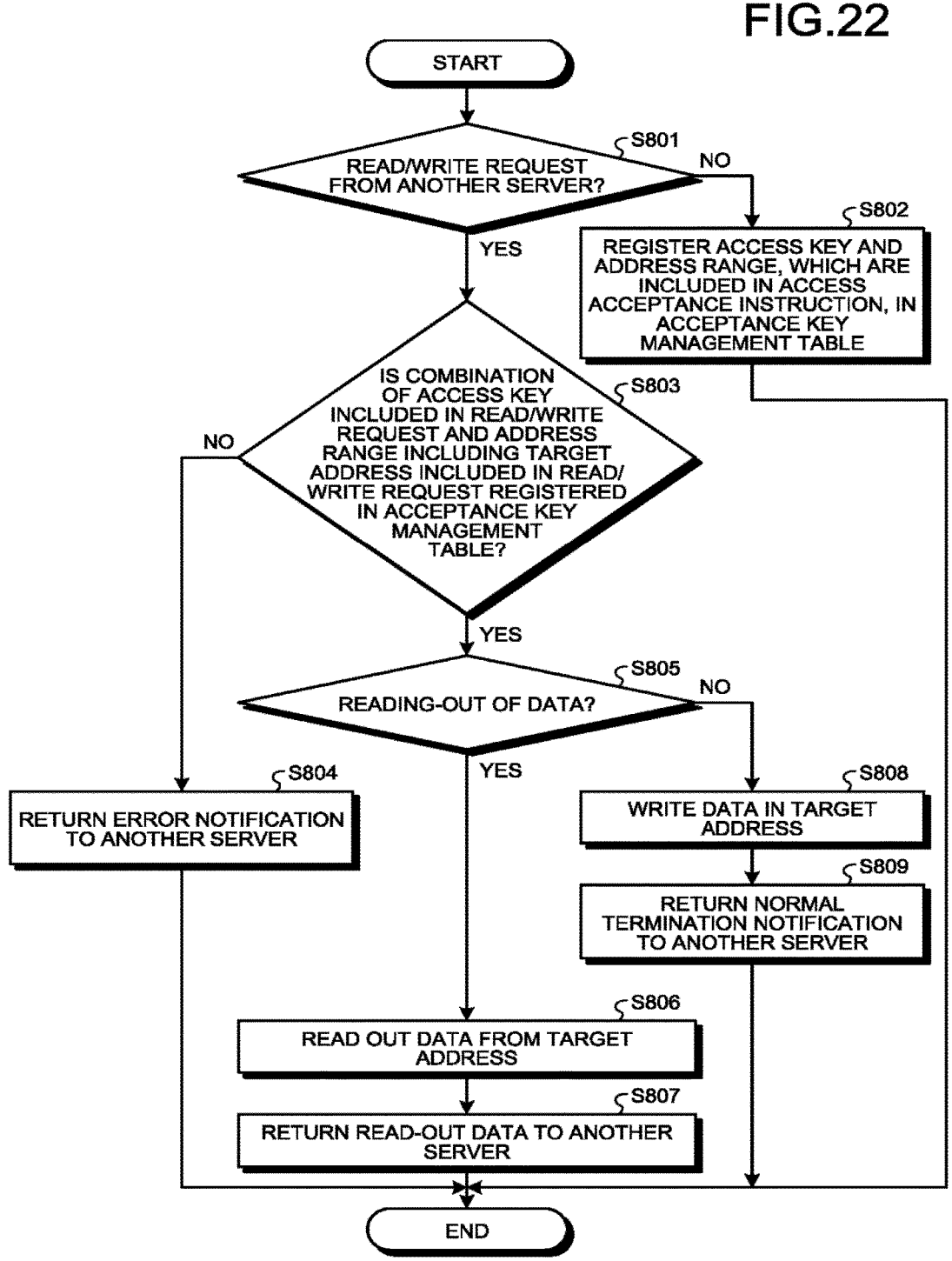
FIG. 22 is a flowchart illustrating an example of a procedure by the read/write request processing unit of the server controller.

FIG. 22 is a flowchart illustrating an example of a procedure by the read/write request processing unit 222 of the server controller 200, and particularly, a procedure by the read/write request processing unit 222 in a case of receiving an input from an outer side instead of an input from the processor 230 in the server 20. Here, the input from an outer side assumes a read/write request from the other server 20 or an access acceptance instruction from the shared memory module 10.

In a case of receiving an input from an outer side, the read/write request processing unit 222 determines whether the input is a read/write request from the other server 20, or an access acceptance instruction from the shared memory module 10 (step S801). Then, if the input from an outer side is the access acceptance instruction from the shared memory module 10 (step S801: No), the read/write request processing unit 222 registers the access key and the address range, which are transmitted from the shared memory module 10, in the acceptance key management table 213 together with the access acceptance instruction (step S802), and terminates the processing.

In a case where the input from an outer side is the read/write request from the other server 20 (step S801: Yes), first, the read/write request processing unit 222 determines whether or not a combination of the access key included in the read/write request and an address range including a target address included in the read/write request is registered in the acceptance key management table 213 (step S803). When the combination of the access key included in the read/write request and the address range including the target address included in the read/write request is not registered in the acceptance key management table 213 (step S803: No), the read/write request processing unit 222 determines that the read/write request from the other server 20 is not valid, returns an error notification to the other server 20 (step S804), and terminates the processing.

When the combination of the access key included in the read/write request and the address range including the target address included in the read/write request is registered in the acceptance key management table 213 (step S803: Yes), the read/write request processing unit 222 executes read/write of data with respect to the local memory 240 in response to the read/write request. That is, when the read/write request indicates reading-out of data (step S805: Yes), the read/write request processing unit 222 reads out data from the target address of the local memory 240 (step S806), returns the read-out data to the other server 20 (step S807), and terminates the processing. When the read/write request indicates writing of data (step S805: No), the read/write request processing unit 222 writes data in the target address of the local memory 240 (step S808), returns a normal termination notification to the other server 20 (step S809), and terminates the processing.

Figure 23:
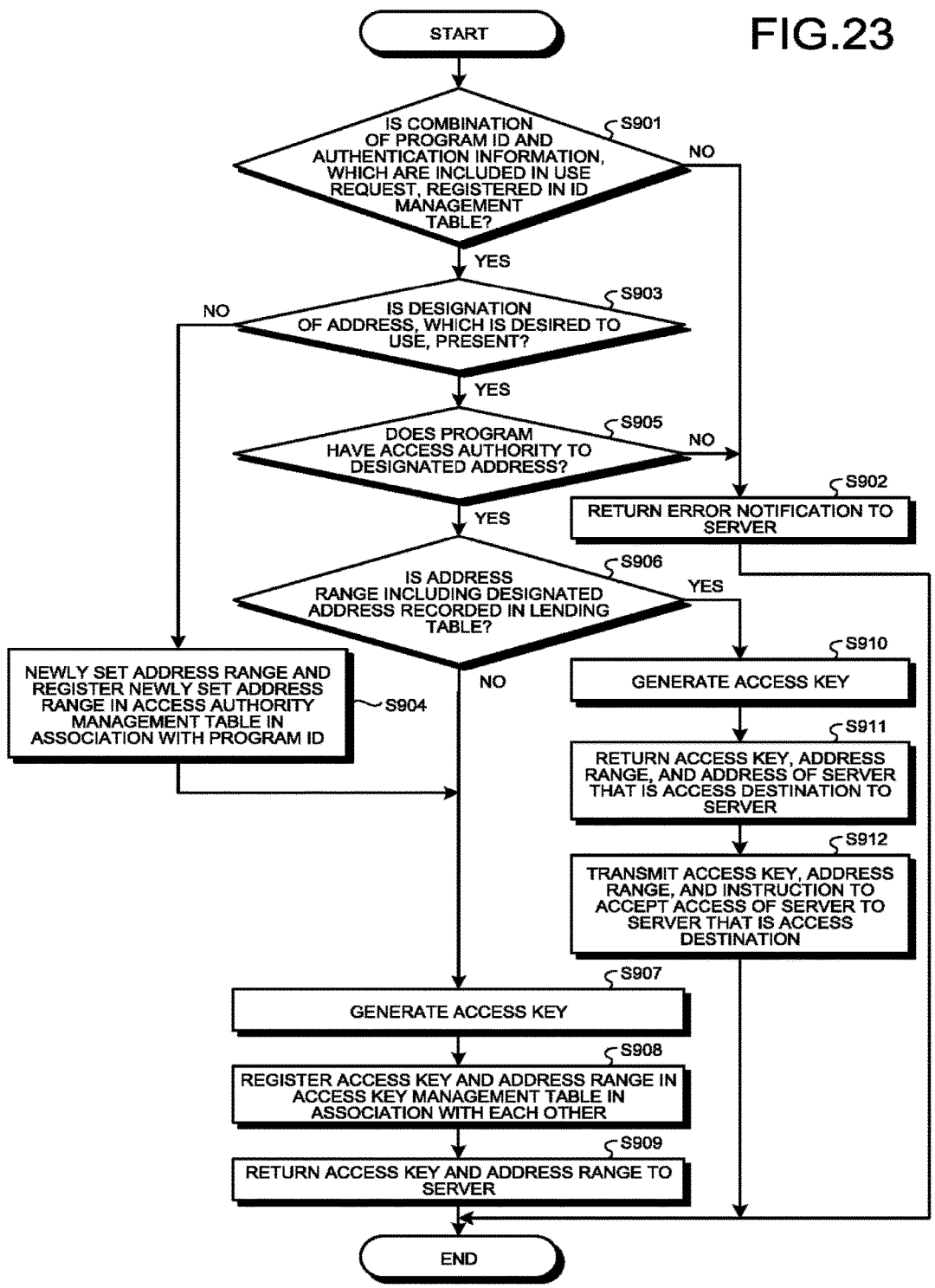
FIG. 23 is a flowchart illustrating an example of a procedure by the use request processing unit of the shared memory controller.

Next, the operation of the shared memory controller 100 will be described. FIG. 23 is a flowchart illustrating an example of a procedure by the use request processing unit 121 of the shared memory controller 100. A series of processing illustrated in the flowchart of FIG. 23 starts when a use request transmitted from the server 20 is received by the shared memory module 10.

When the shared memory module 10 receives the use request, first, the use request processing unit 121 determines whether or not a combination of the program ID and the authentication information, which are included in the use request that is received, is registered in the ID management table 111 (step S901). In a case where the combination of the program ID and the authentication information, which are included in the use request, is not registered in the ID management table 111 (step S901: No), the use request processing unit 121 determines that the use request is not valid, returns an error notification to the server 20 (S902), and terminates the processing.

In a case where the combination of the program ID and the authentication information, which are included in the use request, is registered in the ID management table 111 (step S901: Yes), the use request processing unit 121 subsequently determines whether or not designation of an address, which is desired to use, is present in the use request (step S903). In a case where the designation of the address that is desired to use is not present, that is, only a memory quantity that is desired to use is designated (step S903: No), the use request processing unit 121 newly sets an address range corresponding to the memory quantity that is designated, and registers the address range in the access authority management table 112 in association with the program ID included in the use request (step S904). Then, the processing proceeds to step S907.

In a case where the designation of the address that is desired to use is present in the use request (step S903: Yes), the use request processing unit 121 subsequently checks whether or not the address designated in the use request is included in the address range that is registered in the access authority management table 112 in association with the program ID included in the use request, and determines whether or not the program has access authority to the address (step S905). In a case where it is determined that the program does not have access authority to the address designated in the use request (step S905: No), the use request processing unit 121 determines that the use request is not valid, returns an error notification to the server 20 (step S902), and terminates the processing.

In a case where it is determined that the program has the access authority to the address designated in the use request (step S905: Yes), the use request processing unit 121 subsequently confirms whether or not the address range including the address designated in the use request is recorded in the lending table 114 (step S906). If the address range including the address designated in the use request is not recorded in the lending table 114 (step S906: No), the processing proceeds to the subsequent step S907. Then, the use request processing unit 121 generates an access key for access to the address in the address range registered in the access authority management table 112 (step S907), registers the access key and the address range in the access key management table 113 in association with each other (step S908), returns the access key and the address range to the server 20 (step S909), and terminates the processing.

When the address range including the address designated in the use request is recorded in the lending table 114 (step S906: Yes), the use request processing unit 121 generates an access key for access to the access in the address range registered in the access authority management table 112 (step S910), returns the access key, the address range, and an address of the server 20, which is an access destination, recorded in the lending table 114 to the server 20 that is transmission source of the use request (step S911), transmits the access key, the address range, and an instruction to accept access of another server 20 to the server 20 that is an access destination (step S912), and terminates the processing.

The procedure performed by the read/write request processing unit 122 of the shared memory controller 100 is basically the same as that in the first embodiment (refer to FIG. 13) except for added processing of recording data in the lending table 114 in association with the read-out address range and the address of the server 20 that transmits the data in a case where the data is read out from the shared memory 130 and is transmitted to the server 20. Therefore, description thereof will not be repeated.

As described above in detail with reference to examples, in this embodiment, the shared memory controller 100 knows that data read-out from the shared memory 130 is present in which server 20, and in a case where a use request in which an address range of the data is set as a target is made from another server 20, the other server 20 can directly access the server 20 including the latest data. Accordingly, according to this embodiment, there is no necessity for a countermeasure corresponding to a read/write request of the other server 20 after the server 20 rewrites the read-out data in the shared memory 130 so as to maintain consistency or compatibility of the data, and thus it is possible to reduce waiting time of read/write of data or the quantity of data transmitted. As a result, it is possible to achieve memory management with efficiency.

While a certain embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A shared memory controller that controls access to a shared memory, comprising:
  a storage configured to store therein
    ID management information in which an identifier of a program that uses the shared memory and authentication information are associated with each other,
    access authority management information in which an address range and an identifier of a program for which access to the address range is permitted are associated with each other, and
    access key management information in which an address range and an access key for access to an address within the address range are associated with each other; and
  processing circuitry configured to
    upon receiving a use request including an identifier of a program and authentication information, make a determination on validity of the use request based on the ID management information and the access authority management information,
    when the use request is valid, generate an access key, register the generated access key in the access key management information in correlation with a usable address range, and return the generated access key and the usable address range to a transmission source of the use request,
    upon receiving a read/write request including an address where reading-out or writing of data is performed and an access key, make a determination on validity of the read/write request based on the access key management information, and
    when the read/write request is valid, execute reading-out or writing of data with respect to the shared memory in response to the read/write request.

2. The controller according to claim 1, wherein
  the use request further includes designation of an address that is desired to use or designation of a memory quantity that is desired to use,
  when receiving the use request including the designation of the address that is desired to use, in a case where a combination of the identifier of the program and the authentication information, which are included in the use request, is registered in the ID management information, and the address that is designated in the use request is included in the address range that is registered in the access authority management information in correlation with the identifier of the program included in the use request, the processing circuitry determines that the use request is valid, and returns the address range to a transmission source of the use request as a usable address range together with the access key, and
  when receiving the use request including the designation of the memory quantity that is desired to use, in a case where the combination of the identifier of the program and the authentication information, which are included in the use request, is registered in the ID management information, the processing circuitry determines that the use request is valid, registers a newly set address range and the identifier of the program included in the use request in the access authority management information in correlation with each other, and returns the newly set address range to a transmission source of the use request as a usable address range together with the access key.

3. The controller according to claim 2, wherein
  the use request further includes additional information indicating a type of scheduled access, and
  the processing circuitry determines the newly set address range based on the additional information included in the use request.

4. The controller according to claim 1, wherein the read/write request includes an address range as a data read/write address.

5. The controller according to claim 1, wherein the shared memory is a non-volatile memory.

6. A shared memory module, comprising:
  a shared memory; and
  a shared memory controller that controls access to the shared memory, wherein
  the shared memory controller includes:
    a storage configured to store therein
      ID management information in which an identifier of a program that uses the shared memory and authentication information are associated with each other,
      access authority management information in which an address range and an identifier of a program for which access to the address range is permitted are associated with each other, and
      access key management information in which an address range and an access key for access to an address within the address range are associated with each other; and
    processing circuitry configured to
      upon receiving a use request including an identifier of a program and authentication information, make a determination on validity of the use request based on the ID management information and the access authority management information, when the use request is valid, generate an access key, register the generated access key in the access key management information in correlation with a usable address range, and return the generated access key and the usable address range to a transmission source of the use request, upon receiving a read/write request including an address where reading-out or writing of data is performed and an access key, make a determination on validity of the read/write request based on the access key management information, and when the read/write request is valid, execute reading-out or writing of data with respect to the shared memory in response to the read/write request.

7. A memory sharing system, comprising:
a plurality of servers; and
a shared memory module that is shared by the plurality of servers, wherein
each of the plurality of servers includes a processor that executes a program, and a server controller that controls use of the shared memory by the program,
the shared memory module includes a shared memory, and a shared memory controller that controls access to the shared memory,
the server controller includes:
a server-side storage configured to store therein key management information;
server-side processing circuitry configured to
transmit a use request including an identifier of a program and authentication information to the shared memory module in response to a request of the program that is executed by the processor,
upon receiving an access key and a usable address range from the shared memory module, register the access key and the usable address range thus received in the key management information in correlation with each other,
transmit a read/write request, which includes an address where reading-out or writing of data is performed, and an access key registered in the key management information in correlation with an address range including the address, to the shared memory module in response to a request of a program that is executed by the processor, and
the shared memory controller includes:
a shared memory-side storage configured to store therein
ID management information in which an identifier of a program that uses the shared memory and authentication information are associated with each other,
access authority management information in which an address range and an identifier of a program for which access to the address range is permitted are associated with each other, and
access key management information in which an address range and an access key for access to an address within the address range are associated with each other; and
shared memory side processing circuitry configured to
upon receiving the use request from any one of the plurality of servers, make a determination on validity of the use request based on the ID management information and the access authority management information, when the use request is valid, generate an access key, register the generated access key in the access key management information in correlation with a usable address range, and return the generated access key and the usable address range to a server that is a transmission source of the use request,
upon receiving the read/write request from any one of the plurality of servers, make a determination on validity of the read/write request based on the access key management information, and
when the read/write request is valid, execute reading-out or writing of data with respect to the shared memory in response to the read/write request.

8. The system according to claim 7, wherein
when a first server receives the use request, in which the same address range as an address range of the shared memory from which data is read out is designated, from a second server, and it is determined that the use request is valid, the shared memory-side processing circuitry returns the generated access key, the address range, and an address of the first server to the second server, and transmits the generated access key, the address range, and an instruction to accept access from the second server to the first server,
upon receiving the access key, the address range, and the address of the first server from the shared memory module, the server-side processing circuitry of the second server registers the access key, the address range, and the address of the first server thus received in the key management information in correlation with each other, and
when the address of the first server is registered in the key management information in correlation with an address range including an address where reading-out or writing of data is performed, the server-side processing circuitry of the second server transmits the read/write request to the first server.

* * * * *